(12) United States Patent
Hendren et al.

(10) Patent No.: US 10,942,571 B2
(45) Date of Patent: Mar. 9, 2021

(54) LAPTOP COMPUTING DEVICE WITH DISCRETE HAPTIC REGIONS

(71) Applicant: Apple Inc., Cupertino, CA (US)

(72) Inventors: Keith J. Hendren, San Francisco, CA (US); Dinesh C. Mathew, San Francisco, CA (US); Bryan W. Posner, LaSelva Beach, CA (US); Denis H. Endisch, Cupertino, CA (US); Alex J. Lehmann, Sunnyvale, CA (US); Robert Y. Cao, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/262,754

(22) Filed: Jan. 30, 2019

(65) Prior Publication Data

US 2020/0004337 A1    Jan. 2, 2020

Related U.S. Application Data

(60) Provisional application No. 62/692,447, filed on Jun. 29, 2018.

(51) Int. Cl.
*G06F 3/01* (2006.01)
*G06F 1/16* (2006.01)

(52) U.S. Cl.
CPC ............ *G06F 3/016* (2013.01); *G06F 1/1616* (2013.01); *G06F 1/1671* (2013.01); *G06F 1/1681* (2013.01)

(58) Field of Classification Search
CPC ...... G06F 3/016; G06F 1/1616; G06F 1/1671; G06F 1/1681
See application file for complete search history.

(56) References Cited

U.S. PATENT DOCUMENTS

| 5,196,745 | A | 3/1993 | Trumper et al. |
| 5,293,161 | A | 3/1994 | MacDonald et al. |
| 5,424,756 | A | 6/1995 | Ho et al. |
| 5,434,549 | A | 7/1995 | Hirabayashi et al. |
| 5,436,622 | A | 7/1995 | Gutman et al. |
| 5,668,423 | A | 9/1997 | You et al. |
| 5,842,967 | A | 1/1998 | Kroll |
| 5,739,759 | A | 4/1998 | Nakazawa et al. |
| 6,084,319 | A | 7/2000 | Kamata et al. |
| 6,342,880 | B2 | 1/2002 | Rosenberg et al. |

(Continued)

FOREIGN PATENT DOCUMENTS

| CN | 101036105 | 9/2007 |
| CN | 201044066 | 4/2008 |

(Continued)

OTHER PUBLICATIONS

Author Unknown, "3D Printed Mini Haptic Actuator," Autodesk, Inc., 16 pages, 2016.

(Continued)

*Primary Examiner* — Rufus C Point
(74) *Attorney, Agent, or Firm* — Brownstein Hyatt Farber Schreck, LLP

(57) ABSTRACT

Embodiments described herein relate to an electronic device that provides discrete haptic output in separate regions of a device housing. These regions may both accept input and provide haptic output. Typically, a haptic output provided in a first region is imperceptible to a user touching an abutting region.

20 Claims, 12 Drawing Sheets

(56) References Cited

U.S. PATENT DOCUMENTS

| | | | |
|---|---|---|---|
| 6,373,465 B2 | 4/2002 | Jolly et al. |
| 6,388,789 B1 | 5/2002 | Bernstein |
| 6,438,393 B1 | 8/2002 | Surronen |
| 6,445,093 B1 | 9/2002 | Binnard |
| 6,493,612 B1 | 12/2002 | Bisset et al. |
| 6,554,191 B2 | 4/2003 | Yoneya |
| 6,693,622 B1 | 2/2004 | Shahoian et al. |
| 6,777,895 B2 | 8/2004 | Shimoda et al. |
| 6,822,635 B2 | 11/2004 | Shahoian |
| 6,864,877 B2 | 3/2005 | Braun et al. |
| 6,952,203 B2 | 10/2005 | Banerjee et al. |
| 6,988,414 B2 | 1/2006 | Ruhrig et al. |
| 7,068,168 B2 | 6/2006 | Girshovich et al. |
| 7,080,271 B2 | 7/2006 | Kardach et al. |
| 7,126,254 B2 | 10/2006 | Nanataki et al. |
| 7,130,664 B1 | 10/2006 | Williams |
| 7,196,688 B2 | 3/2007 | Shena et al. |
| 7,202,851 B2 | 4/2007 | Cunningham et al. |
| 7,234,379 B2 | 6/2007 | Claesson et al. |
| 7,253,350 B2 | 8/2007 | Noro et al. |
| 7,276,907 B2 | 10/2007 | Kitagawa et al. |
| 7,321,180 B2 | 1/2008 | Takeuchi et al. |
| 7,323,959 B2 | 1/2008 | Naka et al. |
| 7,336,006 B2 | 2/2008 | Watanabe et al. |
| 7,339,572 B2 | 3/2008 | Schena |
| 7,355,305 B2 | 4/2008 | Nakamura et al. |
| 7,360,446 B2 | 4/2008 | Dai et al. |
| 7,370,289 B1 | 5/2008 | Ebert et al. |
| 7,392,066 B2 | 6/2008 | Hapamas |
| 7,423,631 B2 | 9/2008 | Shahoian et al. |
| 7,508,382 B2 | 3/2009 | Denoue et al. |
| 7,570,254 B2 | 8/2009 | Suzuki et al. |
| 7,576,477 B2 | 8/2009 | Koizumi |
| 7,656,388 B2 | 2/2010 | Schena et al. |
| 7,667,371 B2 | 2/2010 | Sadler et al. |
| 7,667,691 B2 | 2/2010 | Boss et al. |
| 7,675,414 B2 | 3/2010 | Ray |
| 7,710,397 B2 | 5/2010 | Krah et al. |
| 7,710,399 B2 | 5/2010 | Bruneau et al. |
| 7,741,938 B2 | 6/2010 | Kramlich |
| 7,755,605 B2 | 7/2010 | Daniel et al. |
| 7,798,982 B2 | 9/2010 | Zets et al. |
| 7,825,903 B2 | 11/2010 | Anastas et al. |
| 7,855,657 B2 | 12/2010 | Doemens et al. |
| 7,890,863 B2 | 2/2011 | Grant et al. |
| 7,893,922 B2 | 2/2011 | Klinghult et al. |
| 7,904,210 B2 | 3/2011 | Pfau et al. |
| 7,911,328 B2 | 3/2011 | Luden et al. |
| 7,919,945 B2 | 4/2011 | Houston et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,976,230 B2 | 7/2011 | Ryynanen et al. |
| 8,002,089 B2 | 8/2011 | Jasso et al. |
| 8,020,266 B2 | 9/2011 | Ulm et al. |
| 8,040,224 B2 | 10/2011 | Hwang |
| 8,053,688 B2 | 11/2011 | Conzola et al. |
| 8,063,892 B2 | 11/2011 | Shahoian et al. |
| 8,081,156 B2 | 12/2011 | Ruettiger |
| 8,125,453 B2 | 2/2012 | Shahoian et al. |
| 8,154,537 B2 | 4/2012 | Olien et al. |
| 8,174,495 B2 | 5/2012 | Takashima et al. |
| 8,174,512 B2 | 5/2012 | Ramstein et al. |
| 8,169,402 B2 | 6/2012 | Shahoian et al. |
| 8,217,892 B2 | 7/2012 | Meadors |
| 8,217,910 B2 | 7/2012 | Stallings et al. |
| 8,232,494 B2 | 7/2012 | Purcocks |
| 8,248,386 B2 | 8/2012 | Harrison |
| 8,253,686 B2 | 8/2012 | Kyung |
| 8,262,480 B2 | 9/2012 | Cohen et al. |
| 8,264,465 B2 | 9/2012 | Grant et al. |
| 8,265,292 B2 | 9/2012 | Leichter |
| 8,265,308 B2 | 9/2012 | Gitzinger et al. |
| 8,344,834 B2 | 1/2013 | Niiyama |
| 8,345,025 B2 | 1/2013 | Seibert et al. |
| 8,351,104 B2 | 1/2013 | Zaifrani et al. |
| 8,378,797 B2 | 2/2013 | Pance et al. |
| 8,378,965 B2 | 2/2013 | Gregorio et al. |
| 8,384,316 B2 | 2/2013 | Houston et al. |
| 8,390,218 B2 | 3/2013 | Houston et al. |
| 8,390,572 B2 | 3/2013 | Marsden et al. |
| 8,390,594 B2 | 3/2013 | Modarres et al. |
| 8,400,027 B2 | 3/2013 | Dong et al. |
| 8,405,618 B2 | 3/2013 | Colgate et al. |
| 8,421,609 B2 | 4/2013 | Kim et al. |
| 8,432,365 B2 * | 4/2013 | Kim ...................... G06F 3/016 178/18.01 |
| 8,469,806 B2 | 6/2013 | Grant et al. |
| 8,471,690 B2 | 6/2013 | Hennig et al. |
| 8,493,177 B2 | 7/2013 | Flaherty et al. |
| 8,493,189 B2 | 7/2013 | Suzuki |
| 8,576,171 B2 | 11/2013 | Grant |
| 8,598,750 B2 | 12/2013 | Park |
| 8,598,972 B2 | 12/2013 | Cho et al. |
| 8,604,670 B2 | 12/2013 | Mahameed et al. |
| 8,605,141 B2 | 12/2013 | Dialameh et al. |
| 8,614,431 B2 | 12/2013 | Huppi et al. |
| 8,619,031 B2 | 12/2013 | Hayward |
| 8,624,448 B2 | 1/2014 | Kaiser et al. |
| 8,628,173 B2 | 1/2014 | Stephens et al. |
| 8,633,916 B2 | 1/2014 | Bernstein et al. |
| 8,639,485 B2 | 1/2014 | Connacher et al. |
| 8,648,829 B2 | 2/2014 | Shahoian et al. |
| 8,654,524 B2 | 2/2014 | Pance et al. |
| 8,681,130 B2 | 3/2014 | Adhikari |
| 8,686,952 B2 | 4/2014 | Burrough et al. |
| 8,717,151 B2 | 5/2014 | Forutanpour et al. |
| 8,730,182 B2 | 5/2014 | Modarres et al. |
| 8,749,495 B2 | 6/2014 | Grant et al. |
| 8,754,759 B2 | 6/2014 | Fadell et al. |
| 8,760,037 B2 | 6/2014 | Eshed et al. |
| 8,773,247 B2 | 7/2014 | Ullrich |
| 8,780,074 B2 | 7/2014 | Castillo et al. |
| 8,797,153 B2 | 8/2014 | Vanhelle et al. |
| 8,797,295 B2 | 8/2014 | Bernstein et al. |
| 8,803,670 B2 | 8/2014 | Steckel et al. |
| 8,834,390 B2 | 9/2014 | Couvillon |
| 8,836,502 B2 | 9/2014 | Culbert et al. |
| 8,836,643 B2 | 9/2014 | Romera Joliff et al. |
| 8,867,757 B1 | 10/2014 | Ooi |
| 8,872,448 B2 | 10/2014 | Boldyrev et al. |
| 8,878,401 B2 | 11/2014 | Lee |
| 8,890,824 B2 | 11/2014 | Guard |
| 8,907,661 B2 | 12/2014 | Maier et al. |
| 8,976,139 B2 | 3/2015 | Koga et al. |
| 8,976,141 B2 | 3/2015 | Myers et al. |
| 8,977,376 B1 | 3/2015 | Lin et al. |
| 8,981,682 B2 | 3/2015 | Delson et al. |
| 8,987,951 B2 | 3/2015 | Park |
| 9,008,730 B2 | 4/2015 | Kim et al. |
| 9,024,738 B2 | 5/2015 | Van Schyndel et al. |
| 9,046,947 B2 | 6/2015 | Takeda |
| 9,049,339 B2 | 6/2015 | Muench |
| 9,052,785 B2 | 6/2015 | Horie |
| 9,054,605 B2 | 6/2015 | Jung et al. |
| 9,058,077 B2 | 6/2015 | Lazaridis et al. |
| 9,086,727 B2 | 7/2015 | Tidemand et al. |
| 9,092,056 B2 | 7/2015 | Myers et al. |
| 9,104,285 B2 | 8/2015 | Colgate et al. |
| 9,116,570 B2 | 8/2015 | Lee et al. |
| 9,122,330 B2 | 9/2015 | Bau et al. |
| 9,134,796 B2 | 9/2015 | Lemmons et al. |
| 9,172,669 B2 | 10/2015 | Swink et al. |
| 9,218,727 B2 | 12/2015 | Rothkopf et al. |
| 9,245,704 B2 | 1/2016 | Maharjan et al. |
| 9,256,287 B2 | 2/2016 | Shinozaki et al. |
| 9,274,601 B2 | 3/2016 | Faubert et al. |
| 9,280,205 B2 | 3/2016 | Rosenberg et al. |
| 9,286,907 B2 | 3/2016 | Yang et al. |
| 9,304,587 B2 | 4/2016 | Wright et al. |
| 9,319,150 B2 | 4/2016 | Peeler et al. |
| 9,361,018 B2 | 6/2016 | Pasquero et al. |
| 9,396,629 B1 | 7/2016 | Weber et al. |
| 9,430,042 B2 | 8/2016 | Levin |

(56) References Cited

U.S. PATENT DOCUMENTS

| | | |
|---|---|---|
| 9,436,280 B2 | 9/2016 | Tartz et al. |
| 9,442,570 B2 | 9/2016 | Slonneger |
| 9,448,713 B2 | 9/2016 | Cruz-Hernandez et al. |
| 9,449,476 B2 | 9/2016 | Lynn et al. |
| 9,459,734 B2 | 10/2016 | Day |
| 9,466,783 B2 | 10/2016 | Olien et al. |
| 9,489,049 B2 | 11/2016 | Li |
| 9,496,777 B2 | 11/2016 | Jung |
| 9,501,149 B2 | 11/2016 | Burnbaum et al. |
| 9,513,704 B2 | 12/2016 | Heubel et al. |
| 9,519,346 B2 | 12/2016 | Lacroix et al. |
| 9,535,500 B2 | 1/2017 | Pasquero et al. |
| 9,539,164 B2 | 1/2017 | Sanders et al. |
| 9,542,028 B2 | 1/2017 | Filiz et al. |
| 9,557,830 B2 | 1/2017 | Grant |
| 9,557,857 B2 | 1/2017 | Schediwy |
| 9,564,029 B2 | 2/2017 | Morrell et al. |
| 9,594,429 B2 | 3/2017 | Bard et al. |
| 9,600,037 B2 | 3/2017 | Pance et al. |
| 9,600,071 B2 | 3/2017 | Rothkopf |
| 9,607,491 B1 | 3/2017 | Mortimer et al. |
| 9,632,583 B2 | 4/2017 | Virtanen et al. |
| 9,639,158 B2 | 5/2017 | Levesque et al. |
| 9,666,040 B2 | 5/2017 | Flaherty et al. |
| 9,707,593 B2 | 7/2017 | Berte |
| 9,710,061 B2 | 7/2017 | Pance et al. |
| 9,727,238 B2 | 8/2017 | Peh et al. |
| 9,733,704 B2 | 8/2017 | Cruz-Hernandez et al. |
| 9,762,236 B2 | 9/2017 | Chen et al. |
| 9,829,981 B1 | 11/2017 | Ji |
| 9,830,782 B2 | 11/2017 | Morrell et al. |
| 9,857,872 B2 | 1/2018 | Terlizzi et al. |
| 9,870,053 B2 | 1/2018 | Modarres et al. |
| 9,875,625 B2 | 1/2018 | Khoshkava et al. |
| 9,886,090 B2 | 2/2018 | Silvanto et al. |
| 9,904,393 B2 | 2/2018 | Frey et al. |
| 9,921,649 B2 | 3/2018 | Grant et al. |
| 9,927,887 B2 | 3/2018 | Bulea |
| 9,927,902 B2 | 3/2018 | Burr et al. |
| 9,928,950 B2 | 3/2018 | Lubinski et al. |
| 9,940,013 B2 | 4/2018 | Choi et al. |
| 9,977,499 B2 | 5/2018 | Westerman et al. |
| 9,996,199 B2 | 6/2018 | Park et al. |
| 10,025,399 B2 | 7/2018 | Kim et al. |
| 10,037,660 B2 | 7/2018 | Khoshkava et al. |
| 10,061,385 B2 | 8/2018 | Churikov et al. |
| 10,069,392 B2 | 9/2018 | Degner et al. |
| 10,078,483 B2 | 9/2018 | Finnan et al. |
| 10,082,873 B2 | 9/2018 | Zhang |
| 10,108,265 B2 | 10/2018 | Harley et al. |
| 10,110,986 B1 | 10/2018 | Min |
| 10,120,446 B2 | 11/2018 | Pance et al. |
| 10,120,478 B2 | 11/2018 | Filiz et al. |
| 10,120,484 B2 | 11/2018 | Endo et al. |
| 10,133,351 B2 | 11/2018 | Weber et al. |
| 10,146,336 B2 | 12/2018 | Lee et al. |
| 10,235,849 B1* | 3/2019 | Levesque ............... G06F 3/016 |
| 10,275,075 B2 | 4/2019 | Hwang et al. |
| 10,372,214 B1 | 8/2019 | Gleeson et al. |
| 10,382,866 B2 | 8/2019 | Min |
| 10,390,139 B2 | 8/2019 | Biggs |
| 10,394,326 B2 | 8/2019 | Ono et al. |
| 10,397,686 B2 | 8/2019 | Forstner et al. |
| 10,437,359 B1 | 10/2019 | Wang et al. |
| 10,531,191 B2 | 1/2020 | Macours |
| 10,556,252 B2 | 2/2020 | Tsang et al. |
| 10,585,480 B1 | 3/2020 | Bushnell et al. |
| 10,649,529 B1 | 5/2020 | Nekimken et al. |
| 2002/0033795 A1* | 3/2002 | Shahoian ............ G06F 1/1616 345/156 |
| 2003/0117132 A1 | 6/2003 | Klinghult |
| 2005/0036603 A1 | 2/2005 | Hughes |
| 2005/0191604 A1* | 9/2005 | Allen .................. G09B 5/062 434/184 |
| 2005/0230594 A1 | 10/2005 | Sato et al. |
| 2006/0017691 A1 | 1/2006 | Cruz-Hernandez et al. |
| 2006/0209037 A1 | 9/2006 | Wang et al. |
| 2006/0223547 A1 | 10/2006 | Chin et al. |
| 2006/0252463 A1 | 11/2006 | Liao |
| 2007/0106457 A1 | 5/2007 | Rosenberg |
| 2007/0119698 A1* | 5/2007 | Day .................... H03K 17/945 200/510 |
| 2007/0152974 A1 | 7/2007 | Kim et al. |
| 2008/0062145 A1 | 3/2008 | Shahoian |
| 2008/0062624 A1* | 3/2008 | Regen ................. G06F 1/1616 361/679.3 |
| 2008/0084384 A1 | 4/2008 | Gregorio et al. |
| 2008/0111791 A1 | 5/2008 | Nikittin |
| 2009/0085879 A1 | 4/2009 | Dai et al. |
| 2009/0115734 A1 | 5/2009 | Fredriksson et al. |
| 2009/0166098 A1 | 7/2009 | Sunder |
| 2009/0167702 A1 | 7/2009 | Nurmi |
| 2009/0174672 A1 | 7/2009 | Schmidt |
| 2009/0207129 A1 | 8/2009 | Ullrich et al. |
| 2009/0225046 A1 | 9/2009 | Kim et al. |
| 2009/0243404 A1 | 10/2009 | Kim et al. |
| 2009/0267892 A1 | 10/2009 | Faubert |
| 2010/0079264 A1* | 4/2010 | Hoellwarth ............ G06F 3/041 340/407.2 |
| 2010/0116629 A1 | 5/2010 | Borissov et al. |
| 2010/0225600 A1 | 9/2010 | Dai et al. |
| 2010/0231508 A1 | 9/2010 | Cruz-Hernandez et al. |
| 2010/0244765 A1* | 9/2010 | Collopy ............... G06F 1/1624 320/103 |
| 2010/0313425 A1 | 12/2010 | Hawes |
| 2010/0328229 A1 | 12/2010 | Weber et al. |
| 2011/0115754 A1 | 5/2011 | Cruz-Hernandez |
| 2011/0128239 A1 | 6/2011 | Polyakov et al. |
| 2011/0132114 A1 | 6/2011 | Siotis |
| 2011/0169347 A1 | 7/2011 | Miyamoto et al. |
| 2011/0205038 A1 | 8/2011 | Drouin et al. |
| 2011/0261021 A1 | 10/2011 | Modarres et al. |
| 2012/0038469 A1 | 2/2012 | Dehmoubed et al. |
| 2012/0038471 A1 | 2/2012 | Kim et al. |
| 2012/0056825 A1 | 3/2012 | Ramsay et al. |
| 2012/0062491 A1 | 3/2012 | Coni et al. |
| 2012/0113008 A1 | 5/2012 | Makinen et al. |
| 2012/0127071 A1 | 5/2012 | Jitkoff et al. |
| 2012/0235942 A1 | 9/2012 | Shahoian |
| 2012/0313857 A1* | 12/2012 | Senanayake ............ G06F 3/016 345/168 |
| 2012/0327006 A1 | 12/2012 | Israr et al. |
| 2013/0016042 A1 | 1/2013 | Makinen et al. |
| 2013/0043670 A1* | 2/2013 | Holmes ................ B42D 25/29 283/85 |
| 2013/0044049 A1 | 2/2013 | Biggs et al. |
| 2013/0076635 A1 | 3/2013 | Lin |
| 2013/0154996 A1 | 6/2013 | Trend et al. |
| 2013/0207793 A1 | 8/2013 | Weaber et al. |
| 2014/0062948 A1 | 3/2014 | Lee et al. |
| 2014/0125470 A1 | 5/2014 | Rosenberg |
| 2014/0168175 A1 | 6/2014 | Mercea et al. |
| 2015/0084909 A1 | 3/2015 | Worfolk et al. |
| 2015/0126070 A1 | 5/2015 | Candelore |
| 2015/0151562 A1* | 6/2015 | Whiteman ........... B42D 25/369 283/85 |
| 2015/0234493 A1 | 8/2015 | Parivar et al. |
| 2015/0293592 A1 | 10/2015 | Cheong et al. |
| 2016/0098107 A1 | 4/2016 | Morrell et al. |
| 2016/0171767 A1 | 6/2016 | Anderson et al. |
| 2016/0293829 A1 | 10/2016 | Maharjan et al. |
| 2016/0327911 A1 | 11/2016 | Eim et al. |
| 2016/0328930 A1 | 11/2016 | Weber et al. |
| 2016/0379776 A1 | 12/2016 | Oakley |
| 2017/0003744 A1 | 1/2017 | Bard et al. |
| 2017/0024010 A1 | 1/2017 | Weinraub |
| 2017/0249024 A1 | 8/2017 | Jackson et al. |
| 2017/0285843 A1 | 10/2017 | Roberts-Hoffman et al. |
| 2017/0308284 A1* | 10/2017 | Lee ...................... G06F 1/1647 |
| 2017/0357325 A1 | 12/2017 | Yang et al. |
| 2018/0005496 A1 | 1/2018 | Dogiamis et al. |
| 2018/0014096 A1 | 1/2018 | Miyoshi |
| 2018/0029078 A1 | 2/2018 | Park et al. |
| 2018/0081438 A1* | 3/2018 | Lehmann ............ H01L 41/0933 |

(56) References Cited

U.S. PATENT DOCUMENTS

| | | | |
|---|---|---|---|
| 2018/0129459 A1* | 5/2018 | Sylvan | G06F 3/0346 |
| 2018/0181204 A1 | 6/2018 | Weinraub | |
| 2018/0194229 A1 | 7/2018 | Wachinger | |
| 2018/0321841 A1* | 11/2018 | Lapp | G06F 3/04886 |
| 2019/0064997 A1 | 2/2019 | Wang et al. | |
| 2019/0073079 A1 | 3/2019 | Xu et al. | |
| 2019/0310724 A1* | 10/2019 | Yeke Yazdandoost | H01L 27/3211 |
| 2020/0073477 A1 | 3/2020 | Pandya et al. | |

FOREIGN PATENT DOCUMENTS

| | | |
|---|---|---|
| CN | 101409164 | 4/2009 |
| CN | 101436099 | 5/2009 |
| CN | 101663104 | 3/2010 |
| CN | 101872257 | 10/2010 |
| CN | 201897778 | 7/2011 |
| CN | 201945951 | 8/2011 |
| CN | 102349039 | 2/2012 |
| CN | 203405773 | 1/2014 |
| CN | 203630729 | 6/2014 |
| CN | 104679233 | 6/2015 |
| CN | 105144052 | 12/2015 |
| CN | 106133650 | 11/2016 |
| CN | 206339935 | 7/2017 |
| CN | 207115337 | 3/2018 |
| DE | 214030 | 3/1983 |
| EP | 1686776 | 8/2006 |
| EP | 2743798 | 6/2014 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| KR | 101016208 | 2/2011 |
| KR | 20130137124 | 12/2013 |
| TW | 2010035805 | 10/2010 |
| TW | 201430623 | 8/2014 |
| WO | WO2002/073587 | 9/2002 |
| WO | WO2006/091494 | 8/2006 |
| WO | WO2007/049253 | 5/2007 |
| WO | WO2007/114631 | 10/2007 |
| WO | WO2009/038862 | 3/2009 |
| WO | WO 09/156145 | 12/2009 |
| WO | WO2010/129892 | 11/2010 |
| WO | WO2013/169303 | 11/2013 |
| WO | WO2014/066516 | 5/2014 |
| WO | WO2016/091944 | 6/2016 |

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

Stein et al., "A process chain for integrating piezoelectric transducers into aluminum die castings to generate smart lightweight structures," Results in Physics 7, pp. 2534-2539, 2017.

"Lofelt at Smart Haptics 2017," Auto-generated transcript from YouTube video clip, uploaded on Jun. 12, 2018 by user "Lofelt," Retrieved from Internet: <https://www.youtube.com/watch?v=3w7LTQkS430>, 3 pages.

"Tutorial: Haptic Feedback Using Music and Audio—Precision Microdrives," Retrieved from Internet Nov. 13, 2019: https://www.precisionmicrodrives.com/haptic-feedback/tutorial-haptic-feedback-using-music-and-audio/, 9 pages.

"Feel what you hear: haptic feedback as an accompaniment to mobile music playback," Retrieved from Internet Nov. 13, 2019: https://dl.acm.org/citation.cfm?id=2019336, 2 pages.

"Auto Haptic Widget for Android," Retrieved from Internet Nov. 13, 2019, https://apkpure.com/auto-haptic-widget/com.immersion.android.autohaptic, 3 pages.

D-Box Home, Retrieved from Internet Nov. 12, 2019: https://web.archive.org/web/20180922193345/https://www.d-box.com/en, 4 pages.

\* cited by examiner

LAPTOP COMPUTING DEVICE WITH DISCRETE HAPTIC REGIONS

CROSS-REFERENCE TO RELATED APPLICATION(S)

This application is a nonprovisional patent application of and claims the benefit of U.S. Provisional Patent Application No. 62/692,447, filed Jun. 29, 2018 and titled "Laptop Computing Device with Discrete Haptic Regions," the disclosure of which is hereby incorporated herein by reference in its entirety.

FIELD

The described embodiments relate generally to electronic devices, and, more particularly, to providing multiple haptic outputs in discrete regions of an electronic device.

BACKGROUND

Recent advances in portable computing have included providing users with a haptic feedback to indicate that a touch or a force has been received by the portable computing device. Examples of haptic feedback include a vibrating cover on a mobile phone, or a vibration or "click" output from a trackpad on a laptop computing device.

As electronic devices become more compact and sophisticated, the surface area available to provide input and output shrinks. Likewise, the ability of a user to distinguish between haptic outputs on compact devices is diminished, especially when haptic outputs are provided to an entirety of the device's housing, cover, or the like.

SUMMARY

Embodiments described herein relate to an electronic device that provides discrete haptic output in separate regions of a device housing. These regions may both accept input and provide haptic output. Typically, a haptic output provided in a first region (e.g., a "discrete haptic region") is imperceptible to a user touching an abutting region.

One embodiment described herein takes the form of a laptop computing device, comprising: an upper portion; a lower portion hingably connected to the upper portion; a first input device extending through or positioned on the lower portion and configured to accept a first input; a second input device formed on the lower portion, configured to accept a second input and comprising: a first discrete haptic region; and a second discrete haptic region abutting the first discrete haptic region; a first haptic actuator coupled to, and configured to produce a first haptic output in, the first discrete haptic region; and a second haptic actuator coupled to, and configured to produce a second haptic output in, the second discrete haptic region; wherein the first haptic output is imperceptible in the second haptic region to a user; and the second haptic output is imperceptible in the first haptic region to the user.

Another embodiment described herein takes the form of a laptop computing device, comprising: an upper portion; a display housed in the upper portion; a lower portion hingably coupled to the upper portion and comprising: a top case defining an outer surface; and a bottom case coupled to the top case; a keyboard on or extending through the top case; an input area defined on the top case and comprising: a first haptic region; and a second haptic region abutting the first haptic region; a first haptic actuator coupled to the top case within the first haptic region and configured to provide a first haptic output in only the first haptic region; a second haptic actuator coupled to the top case within the second haptic region and configured to provide a second haptic output in only the second region; wherein the first haptic region and second haptic region are continuous with a rest of the outer surface.

Still another embodiment described herein takes the form of a method for providing haptic output through a housing of a laptop, comprising: receiving an input in a haptic input/output area; determining that a haptic output is to be provided; and generating the haptic output in the haptic input/output area through operation of a haptic actuator; wherein: the haptic input/output area includes a first haptic output region and a second haptic output region; the first and second haptic output regions abut one another; and the output is provided in the first haptic output region but not the second haptic output region.

BRIEF DESCRIPTION OF THE DRAWINGS

The disclosure will be readily understood by the following detailed description in conjunction with the accompanying drawings, wherein like reference numerals designate like elements.

Figure 1:
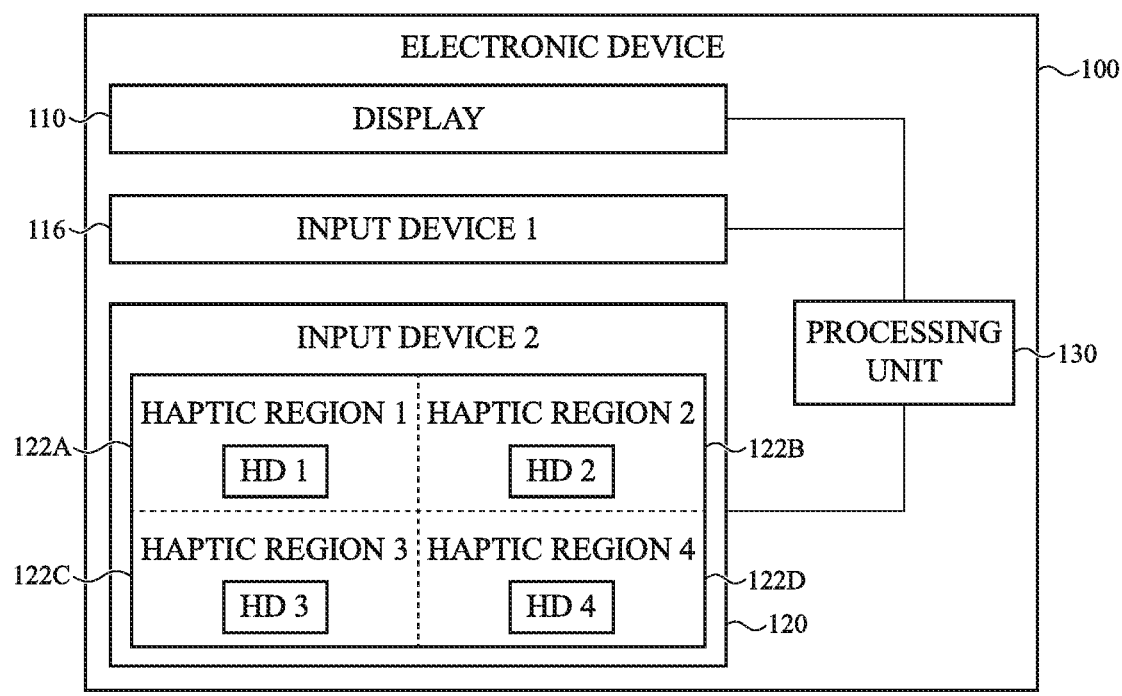
FIG. 1 is a system diagram illustrating certain components of a sample embodiment.

The use of cross-hatching or shading in the accompanying figures is generally provided to clarify the boundaries between adjacent or abutting elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

Embodiments described herein relate generally to electronic devices with one or more input areas that also function to provide spatially localized haptics. "Spatially localized" haptics (or haptic output) generally refers to any haptic signal, e.g., haptic output, that is tactilely perceptible to a person touching a particular active region of the electronic device, but imperceptible outside that region. The surface area over which a single haptic output is perceptible is herein referred to as a "discrete haptic region." There may be any number of discrete haptic regions in an input area of a laptop computing device. The discrete haptic regions may be separated from each other, or they may overlap. Either way, they remain discrete haptic regions each associated with an individual haptic actuator. An "input area" is a structure or surface configured to accept a user input.

For example, an input area may encompass part of an electronic device's housing and be large enough that a user may touch multiple portions of the input area simultaneously. Each touch in the input area may be registered as an input or may be considered by the electronic device as a potential input. Further, the electronic device may provide spatially localized haptic output in each discrete portion of the input area, such that each haptic output is perceived only within its discrete region and not in other portions, areas, or sections of the input region.

In many embodiments, an input area is configured to be manipulated by, or contacted by, a user's finger exerting a touch or force. For example, a user may provide input to the input area through one or more fingers of both hands. The user's fingers may touch or slide across the input area. As one option, spatially localized haptic output may be provided in the input area in such a way that one finger touching the input area perceives the haptic output, but another finger at another location on the input area does not. As such, the haptic output is limited to specific discrete haptic regions of the input area.

While an outer surface of the input area of the top case can be a smooth unbroken surface, the inner surface of the top case, opposite the smooth outer surface, may have one or more haptic actuators coupled to it. The haptic actuators define discrete regions in the input area. As used herein, the term "discrete region" refers to a region of the outer surface of the top case, or other surfaces of the laptop computer, where the haptic output is perceptible by a user. Outside of a given discrete region, the haptic output of the given haptic actuator is imperceptible. "Imperceptible," as used herein, generally means that a haptic output is below the threshold of a typical human tactile perception. Generally, the typical threshold of human perception is approximately 0.2 mm for static features, and on the order of five to 10 microns for displacement of a surface, such as vibration, change in direction along a Z-axis, and so on. It should be appreciated that these values are approximate and may be dependent on certain physical qualities of the input area, such as friction between the input area and the user's skin, a rate at which a vibration or change in dimension occurs (e.g., a wavelength of the haptic output), a material from which the input area is made, and so on.

The presence of multiple haptic actuators can define multiple discrete regions in the surface of the top case, or other laptop computer surfaces, through which a haptic output is provided. For example, three haptic actuators may be coupled to the inner surface of the top case in each of the side areas (left and right) and center area. In this example, three discrete regions (e.g., discrete haptic output sections) would be defined on the input area. Thus, it would be possible to provide localized haptic output to the smooth top case surface of the input area in any or all of the three discrete regions.

In some embodiments, the haptic actuators deform a local area of the input area (e.g., input area) along the Z-axis, which is out of the plane of the input area, rather than in the X-axis or Y-axis (e.g., motion in the plane of the input area). In this case, the haptic actuators move a localized part of the input area optionally in response to an input force. For example, if a user is pushing down on the input area with a finger, the haptic actuators in the specific region "push back" directly at the finger (e.g., along the Z-axis) instead of moving laterally (or in "shear") with respect to the finger (e.g., along the X- or Y-axes).

When the haptic output is directed along the Z-axis, it can provide a crisp, easily-sensed feedback to the user and may be more power efficient than haptic output that vibrates or otherwise shakes a large surface (e.g., moves the surface in shear). A haptic output along the Z-axis generally only locally deforms the input area, while a haptic output in shear generally moves the entire surface or a substantial portion thereof.

Haptic actuators may be coupled to many locations within the input area. The haptic actuators can be connected in such a way as to provide specific, spatially localized haptic output to a discrete region of the input area ranging in size between the area of a fingertip to the area of a palm, or larger.

Generally, haptic output is feedback from the electronic device provided through locations where a user is providing input (e.g., where a user's fingers touch). For example, the haptic output can provide feedback in direct response to an input on a surface that is not actually deflected, such as touching the cover glass of a mobile phone. In this example, the haptic output allows the user to perceive feedback from the device that an input was received. In some embodiments, a haptic output is provided to a surface that is moved, or deflected by a user force, such as a key on a keyboard. Haptic output may provide feedback to the user that a force was registered on the keyboard.

As another option, a haptic output may be provided to a region of the device that is not registering an input. Thus, it is possible to provide a signal, alert, and/or notification to the user through a body part other than the one providing the input. For example, a haptic output may be provided to a palm rest below the keyboard on a laptop computer while the user employs his or her fingers to interact with a keyboard or touch-sensitive input area.

In embodiments, the local haptic actuators can enhance a user's experience by providing spatially localized haptic outputs to signal alerts and/or notifications to the user. For example, spatially localized haptic output may function as notifications or alerts, thereby conveying information related to any or all of a system status, system operation, software cues, and so on. In this case, rather than the spatially localized haptic output providing direct feedback for a user's action, it signals a system or application status to the user. For example, a haptic output could provide a tactile effect to one or more fingers, or a palm of the user positioned on the palm rest area of the input area when the electronic device enters a low power state.

In some embodiments, spatially localized haptic outputs can be provided to one or more locations on the input area simultaneously. Whether the haptic outputs are in direct response to a user's inputs or they are provided as an alert not directly related to a user input, they can be controlled to provide any number of identifiable combinations. For example, in some embodiments, an alert may be signaled by spatially localized haptic outputs to two different discrete haptic regions the input area. Alternatively, in some embodiments, a different alert may be signaled, for example, with haptic outputs provided simultaneously at different discrete haptic regions. It should be appreciated that multiple haptic outputs may be provided simultaneously to alert a user to multiple notifications, statuses, or the like, as well.

In some embodiments, the input area may include touch sensors, force sensors, or both to receive input from a user. Touch and/or force sensors may be coupled to the inner surface of the top case so that user input can be received.

In some embodiments, the input area may be capable of receiving user input, whether touch input, force input, or both, simultaneously with providing haptic output. In embodiments, the haptic output may be localized to the multiple discrete regions defined by the haptic actuators, while the touch and/or force input would not necessarily be localized. To put it another way, the input area may receive user touch and/or force input anywhere on the input area, from one or more sources, as well as provide haptic output to one or more discrete regions, depending on how many haptic actuators are present.

These and other embodiments are discussed below with reference to FIGS. 1-14. However, those skilled in the art will readily appreciate that the detailed description given herein with respect to these figures is for explanatory purposes only and should not be construed as limiting.

FIG. 1 is a system diagram illustrating certain components of an electronic device 100, in accordance with embodiments described herein. The electronic device 100 may include a display 110, first input device 116, second input device 120, and processing unit 130. The processing unit 130 may control operation of the other components, as described in greater detail below. Further, some embodiments may employ multiple processing units 130 rather than a single unit. The first and second input device 116, 120 may each have a dedicated processing unit as may the display 110, for example. In some embodiments a processing unit 130 may oversee or coordinate operation of dedicated processing units for the other components.

Generally, the display 110 is configured to depict graphical output. The display 110 may be implemented by any suitable technology, including OLED, LCD, LED, CCFL, and other technologies. It should be appreciated that the display is optional and may be omitted from some embodiments.

The electronic device 100 may also include first and second input devices 116, 120. The first input device 116 may accept an input from a user and generate an input signal in response. The input signal may be transmitted to the processing unit 130 which may process the input and adjust a function, output, operation, or other feature of the electronic device 100 accordingly. As one non-limiting example, the first input device 116 may be a keyboard; when a user presses a key of the keyboard, the processing unit 130 may instruct the display 110 to show a character corresponding to the depressed key. It should be appreciated that this is merely an example and the first input device 116 may be any suitable input device, including a trackpad, mouse, touch- or force-sensitive structure, microphone, optical sensor, and so on.

The second input device 120 may likewise accept a user input and generate an input signal in response thereto. The second input device 120, however, may define multiple haptic regions 122A, 122B, 122C, 122D, and so on, on its surface. These haptic regions may accept user input but also may provide tactile output to the user. The tactile or haptic output may be generated in response to the user input, in response to a condition of the electronic device (such as a power level, sleep or wake mode, or the like), in response to software, firmware, or the like executing on (or executed by) the electronic device, an environmental condition of the electronic device 100, and so on.

In some embodiments, the second input device 120 may be touch sensitive and/or force sensitive, e.g., able to detect a touch and/or force exerted thereon as an input. One or more touch and/or force sensors may be used to detect such input. Sample sensors include capacitive, optical, resistive, reluctance, and inertial sensors, among any other suitable to detecting touch and/or force. It should be appreciated that multiple inputs may be provided to the second input device 120 simultaneously, and these multiple inputs may be in the same haptic region 122 or in different haptic regions.

Further, in embodiments capable of detecting a force input, it should be appreciated that the embodiment may be capable of detecting non-binary force. That is, the embodiment may be capable of detecting and differentiating between forces within a range, rather than simply determining that a force exceeds a threshold or the like.

Additionally, multiple haptic outputs may be provided in multiple haptic regions 122 simultaneously. This may permit an embodiment to provide multiple haptic outputs in response to multiple inputs and/or system statuses, in response to a single input and/or system status, and so on.

Figure 2:
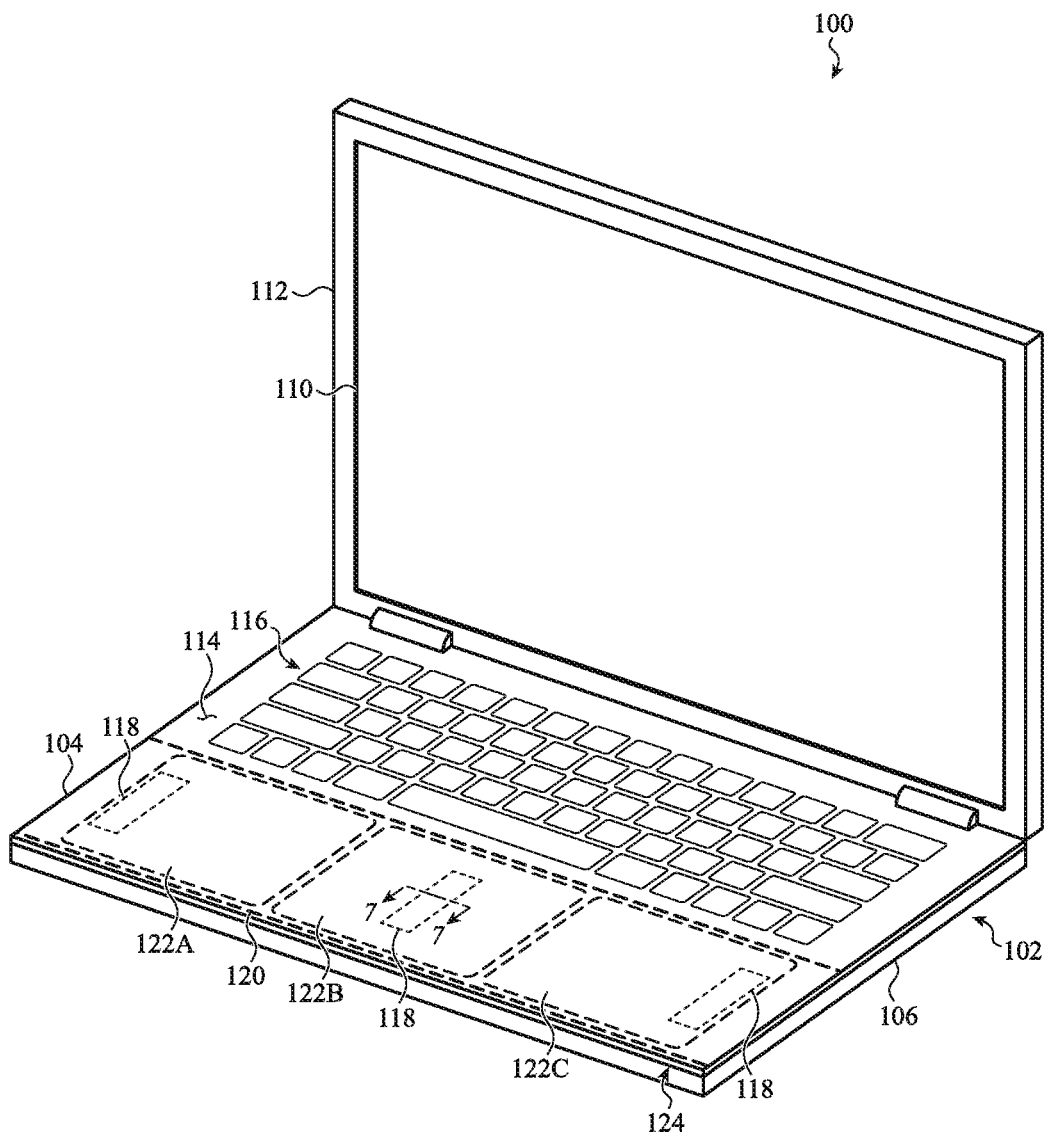
FIG. 2 shows a laptop computing device including a haptic input surface and haptic actuators.

All of the aforementioned elements may be contained within a housing 124 of the electronic device, as discussed in more detail with respect to FIG. 2.

FIG. 2 illustrates a laptop computing device 100 that may include an upper portion 112 and a lower portion 102 hingably coupled to each other and collectively forming a housing. A display 110 can be disposed in the upper portion 112 of the housing. The lower portion 102 of the housing can include a top case 104, including an outer surface 114, configured to accept input, and an inner surface opposite the outer surface 114, and a bottom case 106 attached to the top case 104. The lower portion 102 can also include a keyboard 116 that protrudes through, or is positioned on, the top case 104. The outer surface 114 of the top case 104 further defines an input area 120 adjacent to or abutting the keyboard 116. As used herein, the term "abutting" means that two elements share a common boundary or otherwise contact one another, while the term "adjacent" means that two elements are near one another and may (or may not) contact one another. Two elements that are "coupled to" one another may be permanently or removably physically coupled to one another and/or operationally or functionally coupled to one another.

The upper portion 112, top case, 104, and bottom case 106 may be formed from any suitable material, including metal, plastic, glass, ceramic, and so on.

In some embodiments, a keyboard region and an input area of the laptop computing device 100 present a smooth, unbroken appearance to the user and define a large area in which input can be provided and haptic output received. Thus, in some embodiments, the keyboard region and input area defined on the top case of the laptop computer are unitary, rather than being a collection of separate elements (such as a keyboard, trackpad, or button) set into, or protruding through the top case. In some embodiments, the keyboard region has keys coupled to the unbroken top case, such that signals generated in the keys are transmitted through the top case and received by sensors on an inner surface of the top case. In some embodiments, the keyboard region is sunken below the surface of the top case and has contours on the surface of the keyboard region corresponding to the keys of a keyboard. In these embodiments, the input area is smooth and unbroken.

In some embodiments, the keyboard corresponds to an area cut out of the top case having a keyboard disposed within it, and the keys extend above the surface of the top case. A width of the keyboard and/or the keyboard region can extend substantially from side to side of the top case or can be less than the full width of the top case. Furthermore, the input area may be defined by the region of the top case that includes a width that is substantially the width of the top case, and a length that is from the lower edge of the keyboard and/or keyboard region to the edge of the top case that is parallel to the long edge of the keyboard opposite the upper portion.

In some embodiments, an input area 120 of the top case can define multiple discrete regions. The input area 120 may be a portion of the top case 104 rather than a device, structure, or the like accessible through or coupled to the top case. Put another way, the outer surface 114 of the top case 104 may define the input area 120 and its discrete haptic regions 122. In the present embodiment the discrete haptic regions 122 are generally continuous with the rest of the outer surface 114 of the top case 104; no boundaries, markings, or the like visually or physically separate the discrete haptic regions 122 from one another or the rest of the outer surface. Some embodiments may incorporate boundaries or other markings to visually or tactilely establish edges of an input area 120, haptic input/output region, and/or discrete haptic region(s) 122.

Even though three discrete regions 122 are shown in FIG. 2, the actual number of discrete regions can vary as required by the design. In some embodiments, a laptop computer may have between 1 and 10, or even more, discrete regions comprising the input area. Typically, each discrete haptic region 122 abuts at least one other discrete haptic region (e.g., they share a common boundary).

Haptic actuators 118 are shown in phantom in discrete regions 122, insofar as the actuators would not be visible in the configuration shown in FIG. 2. The haptic actuators 118 can provide local haptic output, as described above, and are coupled to the inner surface of the top case 104. In embodiments where portions of the top case 104 are touch- or force-sensitive, such as the haptic input/output area 121 discussed below, the haptic actuators 118 may be coupled to a touch and/or force sensor. In such embodiments, the touch and/or force sensor(s) may be considered part of the top case.

Generally, the second input device 120 may be positioned adjacent to the keyboard 116 (e.g., first input device) and/or may be separated from the keyboard by a portion of the top case 104. The second input device 120 may be defined on the top case 104 and may be a touch- and/or force-sensitive portion of the top case 104. As mentioned above, the second input device 120 and its discrete haptic regions 122 may be continuous with the rest of the outer surface of the top case 104 and may be visually indistinguishable from the rest of the outer surface. The discrete haptic regions 122 may be tactilely indistinguishable from the rest of the outer surface 114 when no haptic output is provided, as well.

The second input device 120 (e.g., input area) may be similar to the first input device 116 in that it may accept an input from a user and, in response, transmit a signal to the processing unit 130. Further and as with the first input device 116, the second input device 120 may be any of the input devices discussed herein, such as (but not limited to) a keyboard, button, switch, touch-sensitive structure, force-sensitive structure, trackpad, mouse, and so on. The second input device 120 also includes or otherwise defines a haptic input/output (I/O) area 121. The haptic I/O area 121 may be an entire surface of the second input device 120 or a portion thereof. The amount of any surface of the second input device 120 that defines the haptic I/O area 121 may be different between embodiments.

Generally, the haptic I/O area 121 may both accept input and may provide tactile (e.g., haptic) output. Further, the input may be provided at any portion of the haptic I/O area 121 and the haptic output may be felt in any portion of the haptic I/O area. Put another way, an entirety of the haptic I/O area may both accept input and provide tactile output. Thus, a user may touch or exert force at a point on the haptic I/O area 121 and receive haptic output at that same point.

Further, the input area 120 generally has multiple haptic regions 122, such as first through fourth haptic regions 122A, 122B, 122C, 122D. Typically, although not necessarily, each haptic actuator 118 is associated with, and provides haptic output through, a different haptic region 122. The multiple haptic regions 122A-122D may be completely discrete from one another or at least some may overlap. For example and as shown in FIG. 1, the haptic regions 122A-122D may be separate from one another, such that they do not substantially overlap (e.g., they are discrete).

As used herein, the term "discrete" and/or the phrase "not substantially overlapping," and variants thereof, mean that haptic output initiated and/or perceptible in a particular haptic region 122 is imperceptible in a different haptic region to a user touching or interacting with that different haptic region. Thus, while a vibration, motion, or other haptic output may extend from one haptic region 122 into another, the level of that vibration, motion, or the like is below a threshold of human perception. In many embodiments, the typical threshold of human perception is approximately 0.2 mm for static features such as a protrusion, recess, or the like, and on the order of five to 10 microns for displacement of a surface, such as vibration (including vibrations resulting from rapidly forming and removing protrusions, recesses, and the like), change in direction along a Z-axis, and so on. It should be appreciated that these values are approximate and may be dependent on certain physical qualities of the input area, such as friction between the input area and the user's skin, a rate at which a vibration or change in dimension occurs (e.g., a wavelength of the haptic output), a material from which the input area is made, and so on.

As one example, a user may tap or otherwise interact with a first haptic region 122A. The electronic device 100 may sense the user interaction and provide a haptic output in the first haptic region 122A. It should be appreciated that the haptic output may be in response to the user interaction or it may be provided in response to an unrelated state, process, action, or the like. In either case, the haptic output may be provided through the first haptic region 122A because the user touched that region; the electronic device 100 (or, more particularly, its processing unit 130) may determine the haptic output is to be provided through the first haptic region 122A as that region has recently sensed a touch, or force, or other input or potential input.

Continuing the example, presume the user's palm is resting on, and thus contacting, the third haptic region 122C. The haptic output in the first haptic region 122A may be felt by the user's finger but not the user's palm. However, in some embodiments a part of the third haptic region 122C may move slightly insofar as it is coupled to the first haptic region 122A; the magnitude of this motion may be below the user's perceptual threshold. Accordingly, even though a portion of the third haptic region 122C moves, the first and third haptic regions are discrete from one another. Put another way, each haptic region 122 has localized haptic output, insofar as the haptic output in a given region is typically imperceptible in other haptic regions.

Figure 3:
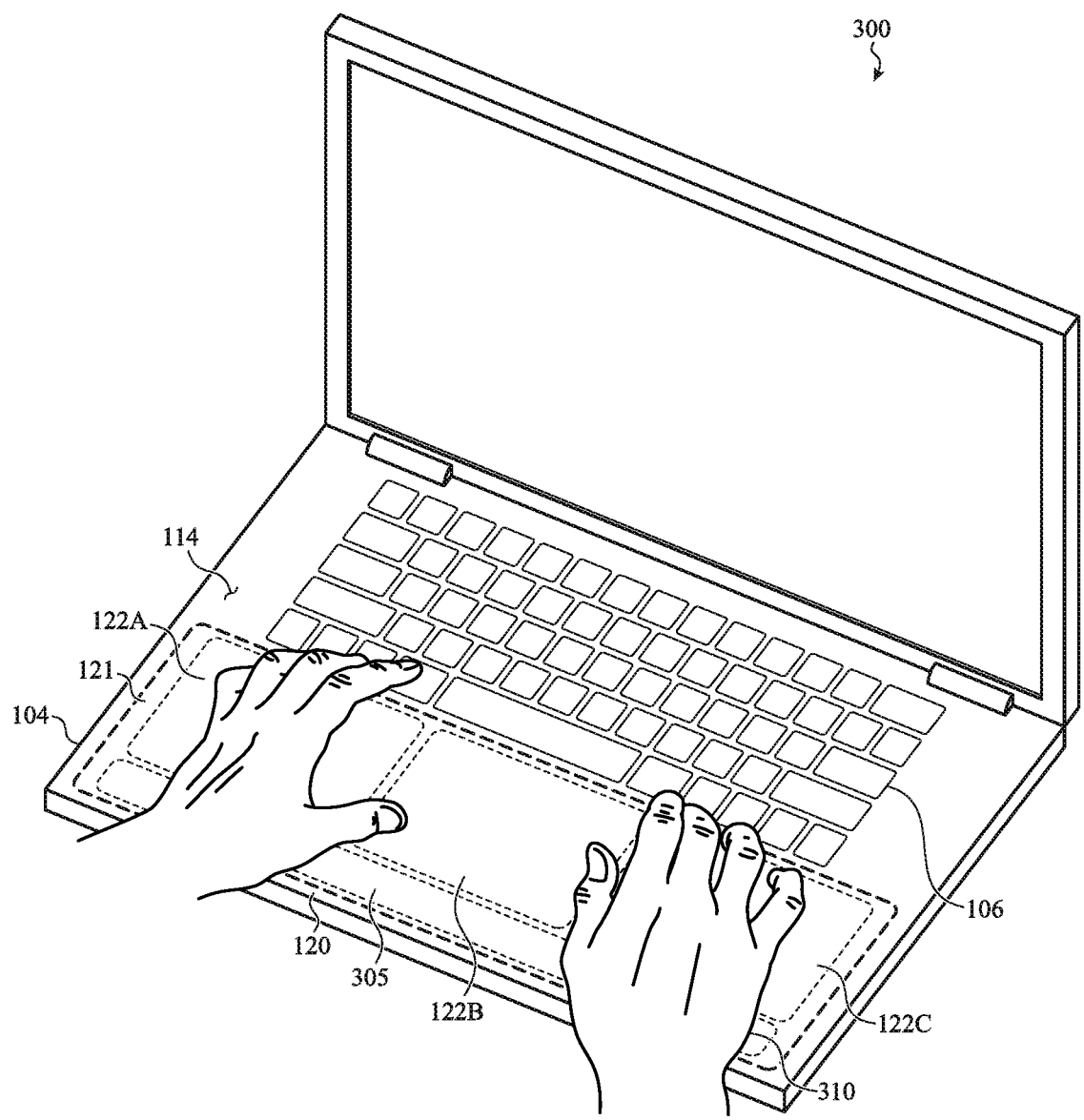
FIG. 3 illustrates a user interacting with a haptic input surface of the laptop computing device of FIG. 2.

FIG. 3 shows the laptop computing device 300 similar to that of FIG. 2, and also illustrates a user interacting with the haptic I/O area 121 and keyboard 116. As previously mentioned, the second input device 120, and thus its haptic I/O area 121, may be positioned next to or adjacent the keyboard 116, or otherwise between the keyboard and an edge of the top case 104 that commonly faces the user when the user interacts with the laptop computing device 100. In some portions of this document this relative positioning may be described as the second input device 120 (and/or haptic I/O area 121) being "below" the keyboard 116.

As discussed above, in some embodiments, the top case 104 may have a smooth and unbroken outer surface 114 in and around the input area 120. Furthermore, the input area 120 generally is a portion of the top case 104 and is not set in (or is not a separate section from) the top case. Thus, the input area of top case is smooth, unlike a trackpad that is inset into a laptop housing.

In the embodiment 300 shown in FIG. 3, the second input device 120 (and, by extension, the outer surface of the top case 104) defines multiple discrete haptic regions 122A, 122B, 122C, in the haptic I/O area 121, similar to the embodiment discussed above with respect to FIG. 2. Here, however, the haptic I/O area 121 also includes a palm rest region 305. The palm rest region 305 may provide haptic output to a user's palm 310 (or other portion of a user) in contact with it, as described in more detail below. One or more haptic actuators (not shown) may be associated with the palm rest region 305 and operate to provide its haptic output in a fashion similar to other haptic actuators described herein.

In some embodiments the palm rest region 305 may not accept input but may provide output. In other embodiments, the palm rest region 305 may function like any haptic region 122, both accepting input and providing output. In embodiments where the palm rest region 305 accepts or otherwise detects input, it may be configured to ignore any input matching a profile of a resting palm. For example, the palm rest region may reject or ignore a touch or force if the contact area is larger than a predetermined size, or it may reject or ignore a touch or force if another part of the second input device 120 or the keyboard 116 is receiving input.

Figure 4:
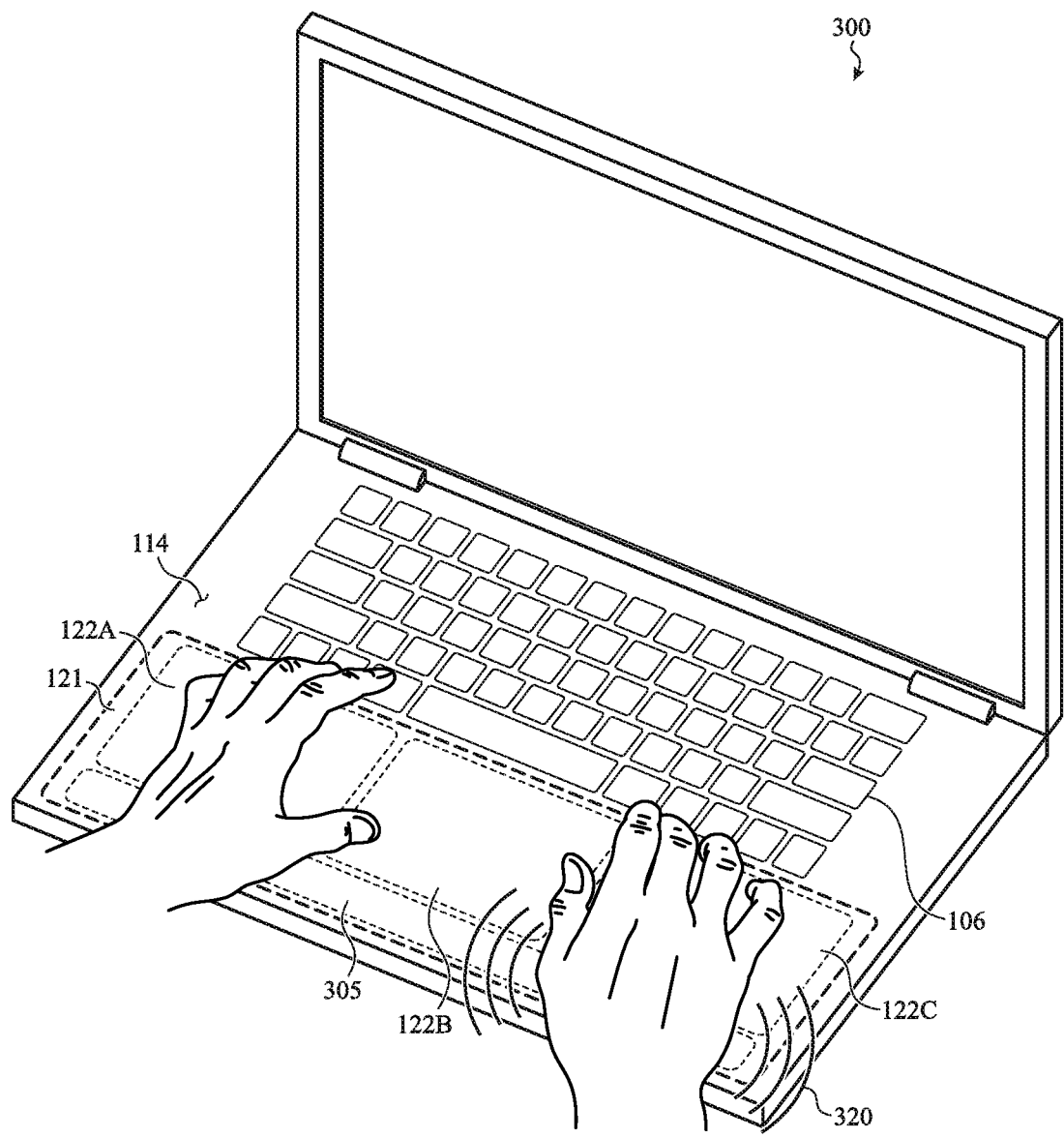
FIG. 4 illustrates a user receiving a haptic output in a palm rest area of the laptop computing device of FIGS. 2 and 3.

FIG. 4 depicts the palm rest region 305 providing a haptic output 320 to a user's palm 310. In the embodiment 300 shown in FIG. 4, the palm rest region 305 may provide haptic output independently of any haptic regions 122A, 122B, 122C in the haptic I/O area 121. Further, in some embodiments the palm rest region 305 may provide haptic output instead of, or in addition to, the haptic regions 122A, 122B, 122C.

As one example, a user may interact with the keyboard 116 to provide input to the laptop computing device 300. Haptic output may be provided at or through the palm rest region 305 in response to the input. Similarly, haptic output may be provided at or through the palm rest region 305 in response to input at another part of the second input device 120. In this fashion the palm rest region 305 may provide haptic feedback to a user, thereby confirming an input, alerting the user of an operating condition of the laptop computing device 300 or software executing thereon, or the like. Providing haptic output through the palm rest region 305 may be useful insofar as the user's palms are typically in contact with the region when the user is interacting with the laptop computing device 300. In some embodiments haptic output may not be provided through the palm rest region 305 unless a touch sensor, force sensor, proximity sensor, or the like determines the user is in contact with the region.

Accordingly, the palm rest region 305 (or any other suitable region of the second input device 120, or any other suitable portion of the top case 104) may be used to provide output in response to an input provided to another part, section, structure, or device of an embodiment 300. Some embodiments may determine whether a user is contacting a particular haptic region 122 or the palm rest region 305 and provide haptic output only in one or more of those regions being touched. This may not only reduce power consumption of an embodiment 300 but may also ensure that the user perceives the haptic output.

FIGS. 5A-5D illustrate sample layouts for haptic actuators 118, shown in various embodiments. Each of FIGS. 5A-5D illustrates a sample laptop computing device 500 (or other electronic device) that includes a keyboard 116 (e.g., first input device) and a touch-sensitive input area 120 (e.g., second input device). As discussed with respect to prior figures, the touch-sensitive input area 120 is generally a defined portion of the top case 104 that detects touch and/or force inputs, rather than a separate structure set into or accessible through the top case. In some embodiments, however, the input area 120 may be a separate structure from the top case 104 or may not share any elements or parts with the top case 104.

As illustrated in FIGS. 5A-5D, the input area 120 may extend to one or more edges of the top case 104 (such as the left and right edges, in the orientation shown in FIGS.

5A-5C) and stop short of some edges (such as the bottom edge). Likewise, the input area 120 may extend to abut the keyboard 116 or may be separated from the keyboard 116 by a buffer region of the top case 104, as shown in FIGS. 5A-5D.

Figure 5A:
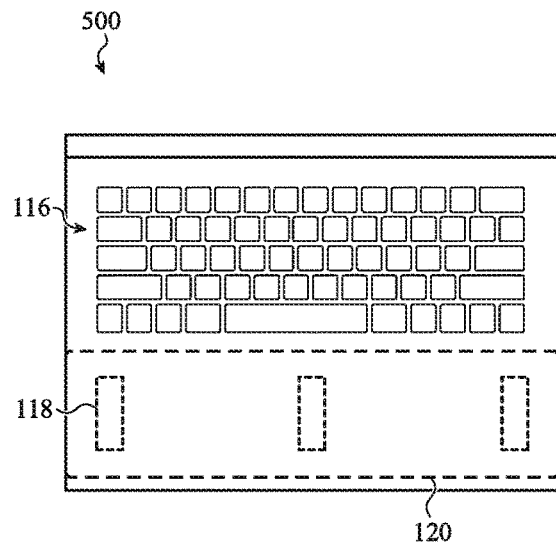
FIG. 5A illustrates a first sample layout of haptic actuators in an input area of a laptop computing device.

FIG. 5A illustrates a laptop computing device 500 having three haptic actuators 118 affixed to an underside of the top case 104, beneath the input area 120. Generally and as described above, the haptic actuators 118 may provide haptic output through the input area to a user touching the input area 120. As also discussed above, each haptic actuator 118 provides its output to a discrete region of the input area 120. It should be appreciated that the haptic actuators 118 may operate at the same time, one at a time, or in groups of two (or more, in other embodiments). Multiple haptic actuators 118 may provide haptic output simultaneously or at overlapping times in order to provide more complex output, constructively or destructively interfere with one another, enhance or reduce haptic output in portions of one or more haptic regions 122, and so on. As one non-limiting example, haptic actuators 118 associated with abutting discrete haptic regions 122 may provide output at the same time to enhance one another, thereby providing a greater haptic output in one or both of the abutting discrete haptic regions 122 than if that region's haptic actuator operated alone. It should be appreciated that, when haptic actuators 118 cooperate to provide such enhanced output, output from one haptic actuator may impact an abutting discrete haptic region 122 by enhancing the output of that haptic region's actuator. In the absence of cooperation between haptic actuators, each haptic actuator's output is perceptible only within its associated haptic region 122.

Figure 5B:
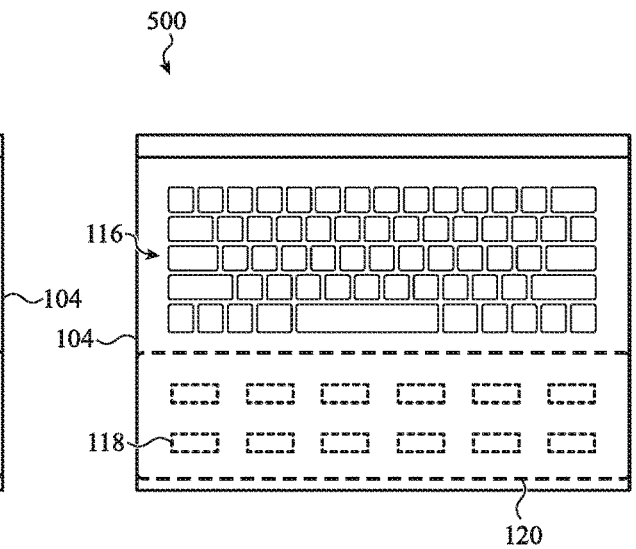
FIG. 5B illustrates a second sample layout of haptic actuators in an input area of a laptop computing device.

FIG. 5B illustrates the laptop computing device of FIG. 5A, but with a different number of, and configuration for, the haptic actuators 118. Here, there are 12 haptic actuators 118 in two rows. Insofar as each haptic actuator 118 is associated with its own discrete haptic region 122, it should be appreciated that haptic regions can be organized into rows and columns as well.

Figure 5C:
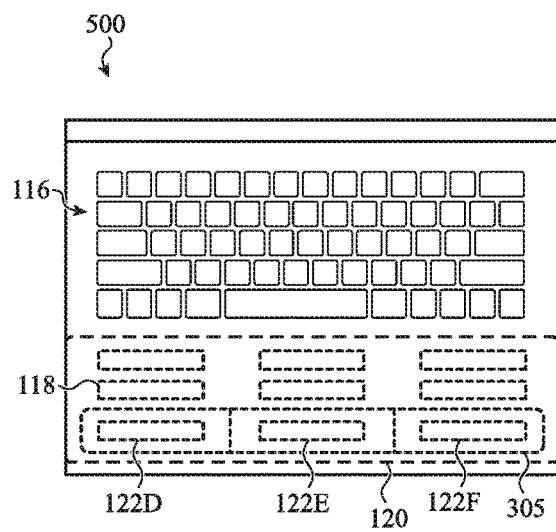
FIG. 5C illustrates a third sample layout of haptic actuators in an input area of a laptop computing device.

FIG. 5C illustrates the laptop computing device of FIG. 5A with yet another configuration of haptic actuators 118. The electronic device 500 again includes a first input device 116 in the form of a keyboard and a second input device in the form of a touch-sensitive (and/or force-sensitive) input area 120. Here, as with the embodiment shown in FIGS. 3-4, the input area 120 includes discrete haptic regions 122, one of which is a palm rest region 305.

The palm rest region 305 includes multiple haptic actuators 118 in the embodiment shown in FIG. 5C. As previously discussed, each haptic actuator 118 may be associated with a discrete haptic region. Accordingly, in some embodiments the palm rest region 305 may be subdivided into separate, discrete haptic regions 122D, 122E, 122F. Haptic output may be provided discretely through these haptic regions 122D, 122E, 122F in order to actuate only a portion of the palm rest region 305. Further, the haptic regions 122D, 122E, 122F, making up the palm rest region 305 may be operative to accept input in some embodiments, although in other embodiments these haptic regions may provide output only (as is true with any haptic region 122 discussed herein).

Figure 5D:
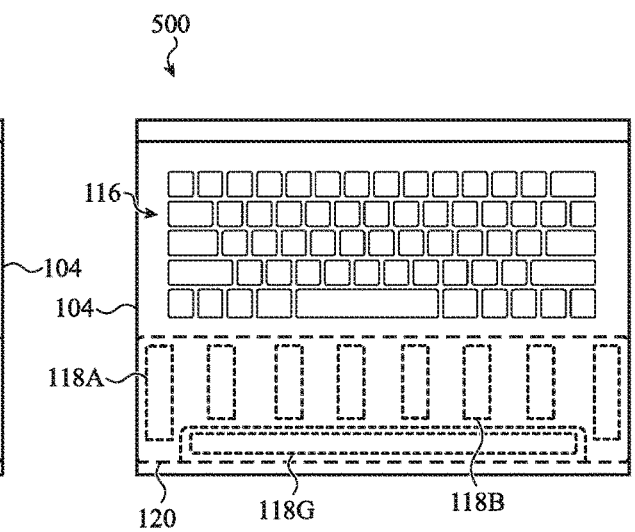
FIG. 5D illustrates a fourth sample layout of haptic actuators in an input area of a laptop computing device.

FIG. 5D illustrates yet another configuration of haptic actuators 118 for a laptop computing device 500. Similar to embodiments illustrated in FIGS. 5A-5C, the haptic actuators may be positioned beneath the top case 104, within a boundary of the input area 120. Here, however, the palm rest region 305 includes a single haptic actuator 118G. Thus, all of the palm rest region 305 provides haptic feedback and can be considered a single haptic region. Further and as also shown in FIG. 5D, the haptic actuator 118G may be elongated as compared to the other haptic actuators 118A, 118B of the input area 120. Similarly, the end haptic actuators 118A are longer in at least one dimension than the inner haptic actuators 118B. Haptic actuators 118 may have different sizes and/or shapes, as may haptic regions 122. In this manner the input area 120 may be divided into a number of haptic regions 122 of differing sizes and/or shapes, which provides greater options for localizing haptic input for a user.

Figure 6A:
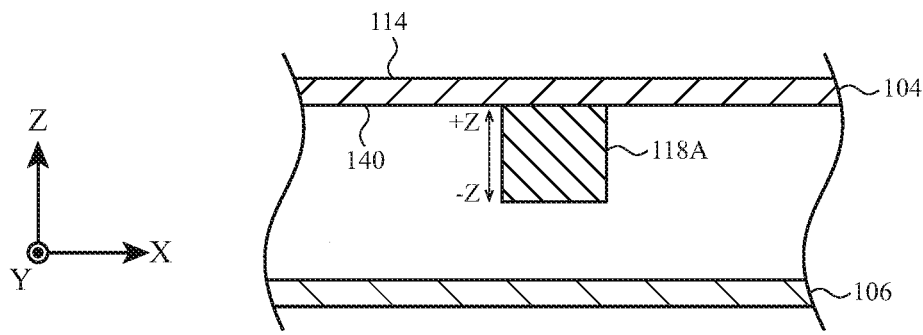
FIG. 6A is a cross-section view illustrating a haptic actuator at rest.
Figure 6B:
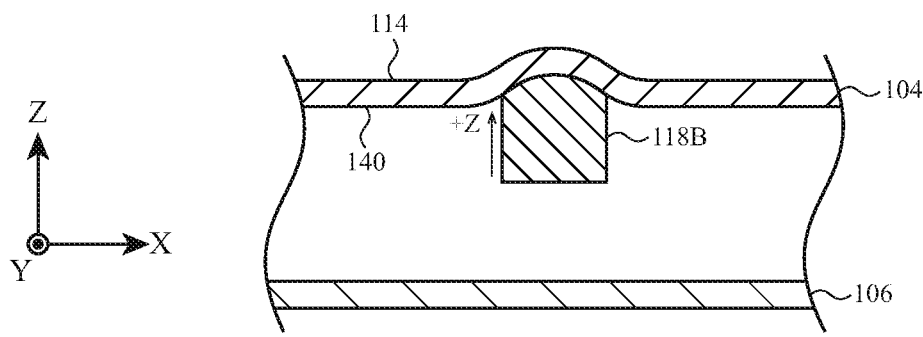
FIG. 6B is a cross-section view illustrating the haptic actuator of FIG. 6A forming a protrusion on a top case of a laptop computing device.
Figure 6C:
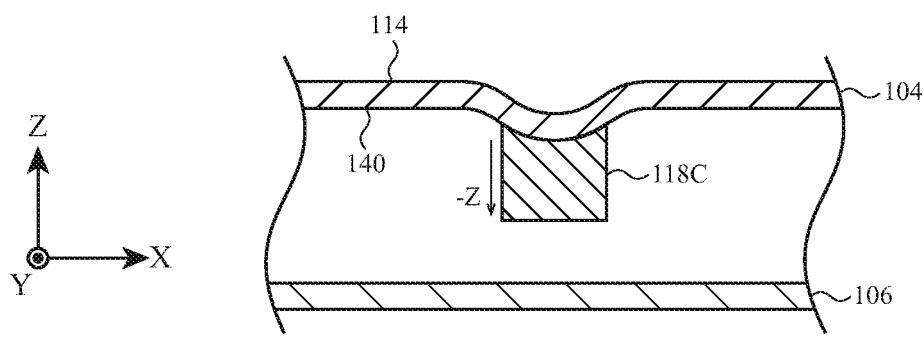
FIG. 6C is a cross-section view illustrating the haptic actuator of FIG. 6A forming a recess on a top case of a laptop computing device.

In many embodiments, haptic actuators may be coupled to the inner surface of the top case at a location corresponding to the input area, in order to provide a haptic output through the input area. The haptic output can be localized so that the haptic output is perceived in discrete regions of the top case 104, as previously described. In FIGS. 6A-6C, which are cross-section views, a haptic actuator 118 is shown attached to the inner surface 140 of the top case 104. The haptic actuator 118 is not fixed to the bottom case 106. This permits the haptic actuator 118 to locally deform the top case 104 in order to generate haptic output. The haptic actuator 118 is shown in schematic format for ease of illustration.

In FIG. 6A the haptic actuator is shown in a rest or neutral state. When the haptic actuator 118 is in its rest state, the top case 104 is undeformed. Typically, although not necessarily, the top case 104 (or the outer surface 114 of the top case) is flat when the haptic actuator 118 is at rest. As also shown in FIG. 6A, there is no separate inset, structure, or the like forming the outer surface 114 above the haptic actuator 118. Rather, the top case 104 extends in an unbroken manner over the haptic actuator. Thus and as mentioned earlier, the top case 104 itself forms the haptic region 122 associated with the haptic actuator, and by extension also forms the input area 120. The top case 104 may appear smooth and/or unbroken from side to side, rather than defining a depression, cutout or hole through which the input area 120 and its haptic region(s) 122 are accessed.

FIG. 6B shows one sample activation or motion of the haptic actuator 118. Here, the haptic actuator 118 moves upward (e.g., along the Z axis and away from the bottom case 106). This pushes upward on the top case 104, causing its outer surface 114 to protrude in the region affixed to the haptic actuator 118. A user touching this portion of the top case 104 perceives this upward deformation of the top case 104 as a haptic output.

FIG. 6C illustrates another sample activation or motion of the haptic actuator 118. In certain embodiments the haptic actuator may also move downward (e.g., along the Z axis and toward the bottom case 106). The haptic actuator 118 pulls the top case 104 downward with it, thereby creating a recess in the outer surface 114 of the top case 104 above the haptic actuator. A user touching this portion of the top case 104 perceives this downward deformation of the top case 104 as a haptic output. Accordingly, both protrusions and recesses (collectively, "deformations") in the outer surface 114 of the top case 104 can be caused by motion of a haptic actuator 118, and both may provide haptic output in a discrete haptic region to a user.

Figure 7:
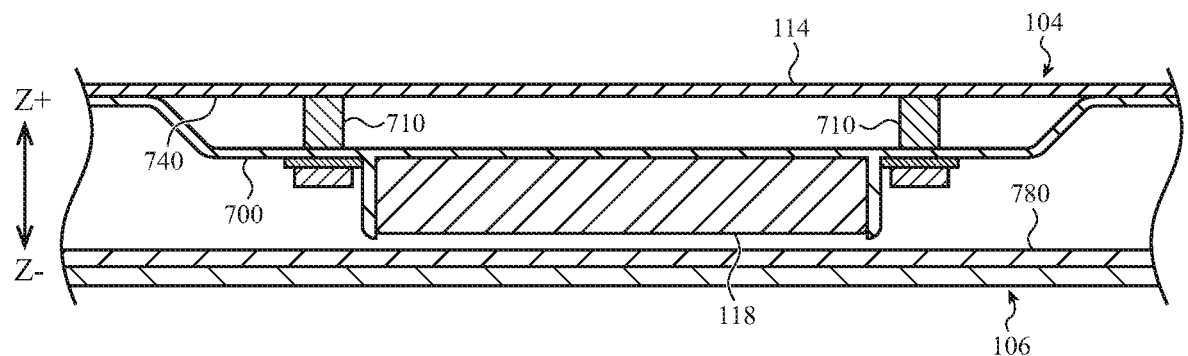
FIG. 7 is a cross-section view taken along line 7-7 of FIG. 2, illustrating a sample haptic actuator connected to a top case of a laptop computing device.

FIG. 7 is a cross-sectional view taken along line 7-7 of FIG. 2, illustrating a sample haptic actuator 118 attached to a top case 104 of a sample electronic device by a brace 700. The brace retains the haptic actuator 118 (or is otherwise coupled to the haptic actuator) and may fully or partially surround it.

In turn, in the depicted embodiment the brace 700 is coupled to the top case 104 by retainers 710, which are physical structures supporting the brace and affixed to the top case. The retainers 710 may be bosses or other structures and may be formed integrally with the top case 104 or may be separate elements. The retainers may be screws, nuts, or other fasteners. The retainers 710 may be one or more layers or deposits of adhesive. The retainers 710 may be part of the brace 700 itself and may be located in different locations than illustrated. The retainers 710 may pass through the brace 700 as shown or may not in some embodiments. In some embodiments a distance or separation between the retainers 710 may dictate a size of a deformation in the top case 104, and thus a size of any associated haptic region 122. It should be appreciated that the size of the haptic region 122 may be greater than the distance between the retainers 710 insofar as any deformation in the top case 104 may be greater in dimension than the aforementioned distance.

A battery 780 may be positioned below the haptic actuator 118 and may be coupled to and/or abut the bottom case 106. Generally, the haptic actuator 118 is spaced apart from the battery 780 such that the haptic actuator 118 does not contact the battery when it actuates, as described below. Likewise, spacing between the battery 780 and haptic actuator 118 is such that the battery does not contact the haptic actuator if the battery swells.

Generally, the haptic actuator 118 may deform, bend, or move (collectively, "actuate") in response to a signal. This actuation may cause the brace 700 to bend or otherwise move insofar as the brace is coupled to the haptic actuator. The retainers 710 are typically rigid or semi-rigid, and thus transfer the brace's motion to the top case 104, which causes a part of the top case above or adjacent the brace 700 and/or haptic actuator 118 to protrude or recess. The resulting protrusion or recess/depression formed in the outer surface 114 of the top case 104 may be felt by a user as haptic feedback.

The haptic actuator 118 may be rapidly actuated such that the outer surface 114 protrudes and/or recesses multiple times. This oscillation of the top case 104 may be felt as a vibration, tapping, or the like and is one example of dynamic haptic feedback provided by an embodiment. As another option, the haptic actuator 118 may be actuated and maintained in an actuated state so that the outer surface 114 maintains its deformation (e.g., its protrusion or recess), which is an example of static haptic feedback. Thus, a haptic actuator 118 may induce or otherwise provide static and/or dynamic haptic feedback through the top case, and through any input area 120 and/or haptic region 122 defined on an outer surface 114 of the top case.

Haptic actuators 118 may take many forms. Various materials, structures, devices and the like may be used as haptic actuators 118, including shape memory alloys, linear reluctance motors, linear vibrators, piezoelectric materials, electroactive polymers, magnetic devices, pneumatic devices, hydraulic devices, and so on. FIGS. 8-11 discuss sample haptic actuators 118 but it should be understood that these are provided as example actuators rather than as an exhaustive list.

Figure 8:
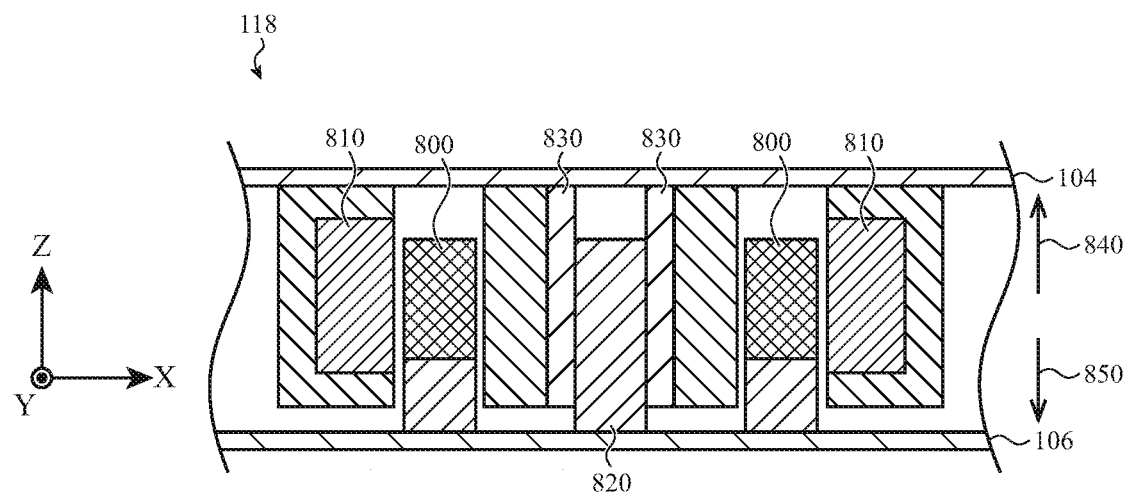
FIG. 8 is a cross-section view of another sample haptic actuator.

FIG. 8 shows a linear reluctance motor (LRM) style haptic actuator 118. The LRM includes a magnet 800, a coil 810, a guide shaft 820, and a bearing 830. Typically, although not necessarily, the magnet 800, coil 810, and bearing 830 are circular or cylindrical. Although the coil 810 is shown as encircling the magnet 800, this may be reversed in some embodiments. Likewise, the positions of the bearing 830 and guide shaft 820 may be different in other embodiments.

The magnet 800 and the guide shaft 820 are coupled to the bottom case 106, although in other embodiments they may be coupled to the top case 104 or may be contained in a separate housing. The coil 810 and the bearing 830 are coupled to the top case 104 but may be coupled to the bottom case 106 or a separate housing in other embodiments. Haptic output is produced by the haptic actuator 118 when the coil 810 is energized by an electric current, causing the coil 810 to repel the magnet 800. Insofar as the top case 104 is typically thinner, more flexible and less structurally supported than the bottom case 106, it will deform first. Thus, the bottom case 106 supports and stabilizes the magnet 800 while the top case 104 permits the coil to move away from the magnet and exert force upward on the top case (e.g., in the +Z direction as shown by arrow 840). This locally deforms the top case 104 to provide haptic output, causing a protrusion.

In some embodiments, the magnet 800 and/or coil 810 may be aligned to cause the coil 810 to move downward relative to the magnet 800, thereby exerting a downward force on the top case 104 and causing a recess in the top case (e.g., in the −Z direction as shown by the arrow 850). This, too, is a type of haptic output.

The guide shaft 820 and bearing 830 ensure that any motion of the top case 104 is confined to the Z axis. This may enhance the haptic output by reducing energy used to move the top case 104 in shear (e.g., in the X-Y plane).

In still further embodiments, the coil 810 may be stationary and the magnet 800 may move.

Figure 9:
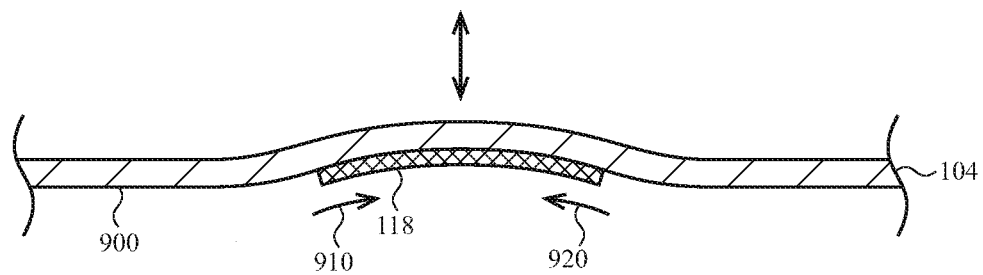
FIG. 9 is a cross-section view of yet another sample haptic actuator.

FIG. 9 shows a first piezoelectric haptic actuator 118, and particularly a piezoelectric material coupled to the top case 104. The bottom case 106 is omitted from this view.

The piezoelectric haptic actuator 118 is coupled directly to an inner surface 900 of the top case 104, which may be a touch-sensitive or force-sensitive layer in certain embodiments. When energized, the piezoelectric haptic actuator shortens, causing the top case 104 (to which the piezoelectric actuator is attached) to bend, thereby forming a protrusion. This shortening is caused by opposing ends of the piezoelectric material moving towards each other, as illustrated by directional arrows 910, 920. The shortening of the piezoelectric actuator and the consequent deformation of the top case 104 is perceived by the user as a haptic output. In some embodiments the haptic actuator 118 may be configured to cause a recess or depression in the top case 104 rather than a protrusion.

Figure 10:
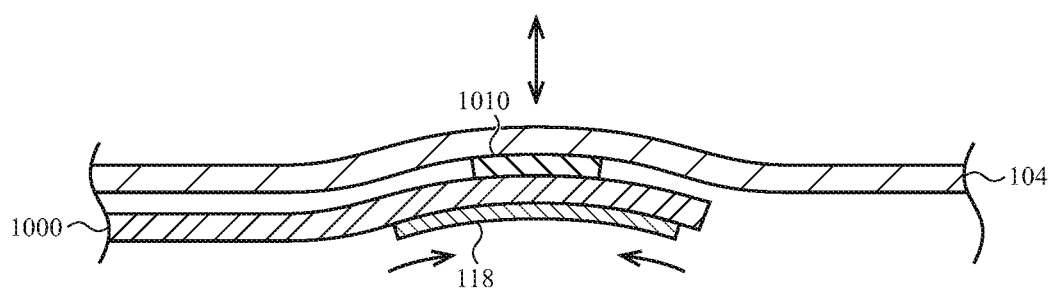
FIG. 10 is a cross-section view of still another sample haptic actuator.

FIG. 10 shows another piezoelectric haptic actuator 118. In this embodiment the piezoelectric actuator 118 is coupled to a beam 1000 rather than the top case 104. The beam 1000 is in turn coupled to the top case 104 by a shim 1010 or another connector. As the haptic actuator 118 actuates, it contracts and bends or otherwise deflects the beam 1000. The beam likewise deflects the top case 104 through the shim 1010, causing a protrusion or a recess to form. A user perceives this deformation as haptic feedback.

Figure 11:
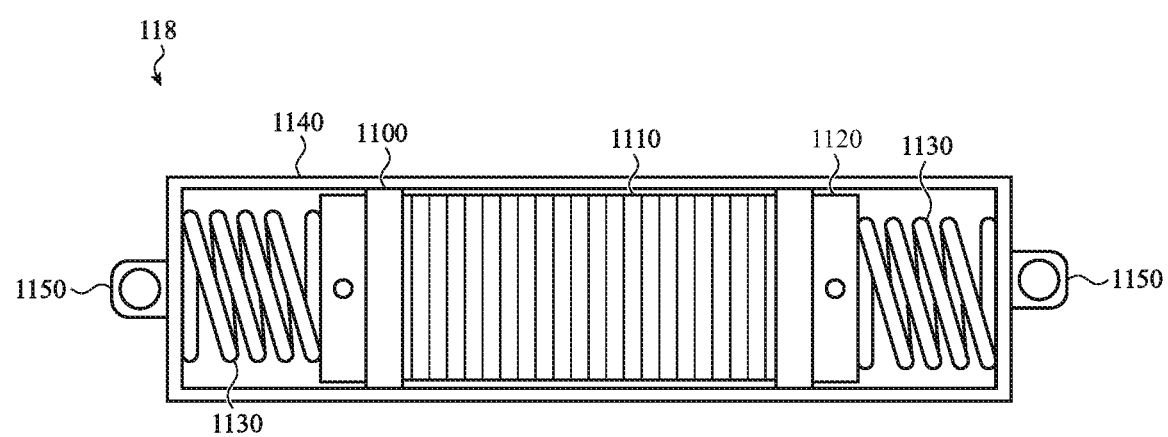
FIG. 11 is a cross-section view of a further sample haptic actuator.

FIG. 11 shows an inertial haptic actuator 118. The inertial haptic actuator has a magnet 1100, a coil 1110, a mass 1120, and springs 1130 enclosed within an actuator housing 1140. The mass is typically coupled to the magnet 1100 or coil 1110. Attachment features 1150 couple the haptic actuator 118 to a top case 104 (or other portion of a housing) of an electronic device.

The coil 1110 generates a magnetic field when current passes through it (e.g., when the coil is energized). This magnetic field interacts with the magnet 1100 and generates a Lorentz force that moves the magnet 1100 and coupled mass 1120. The mass moves linearly toward an end of the haptic actuator 118; the spring 1130 prevents the mass from directly impacting the actuator housing 1140.

When the coil 1110 is de-energized, or alternately subjected to a reverse current, the magnet 1100 and mass 1120 move in the opposite direction. This alternating movement imparts force to the actuator housing 1140 and, through the attachment features 1150, to the top case of an electronic device (or any other part of an electronic device to which the actuator 118 is coupled). This force may cause the top case to move or vibrate, either of which may be perceived by a user as a haptic output.

In contrast to the haptic actuators illustrated in FIGS. 8-10, the haptic output of the present haptic actuator 118 is primarily in the X-Y plane. That is, the top case moves in shear relative to a user's finger in contact with the case rather than pressing into the user's finger.

In some embodiments, a haptic output can involve multiple simultaneous outputs, or signals. For example, the haptic output can involve signals being provided by more than one discrete region simultaneously, or in a pattern. Combinations of signals, both simultaneous and non-simultaneous can be provided in order for the user to be able to distinguish between many possible signals.

Figure 12:
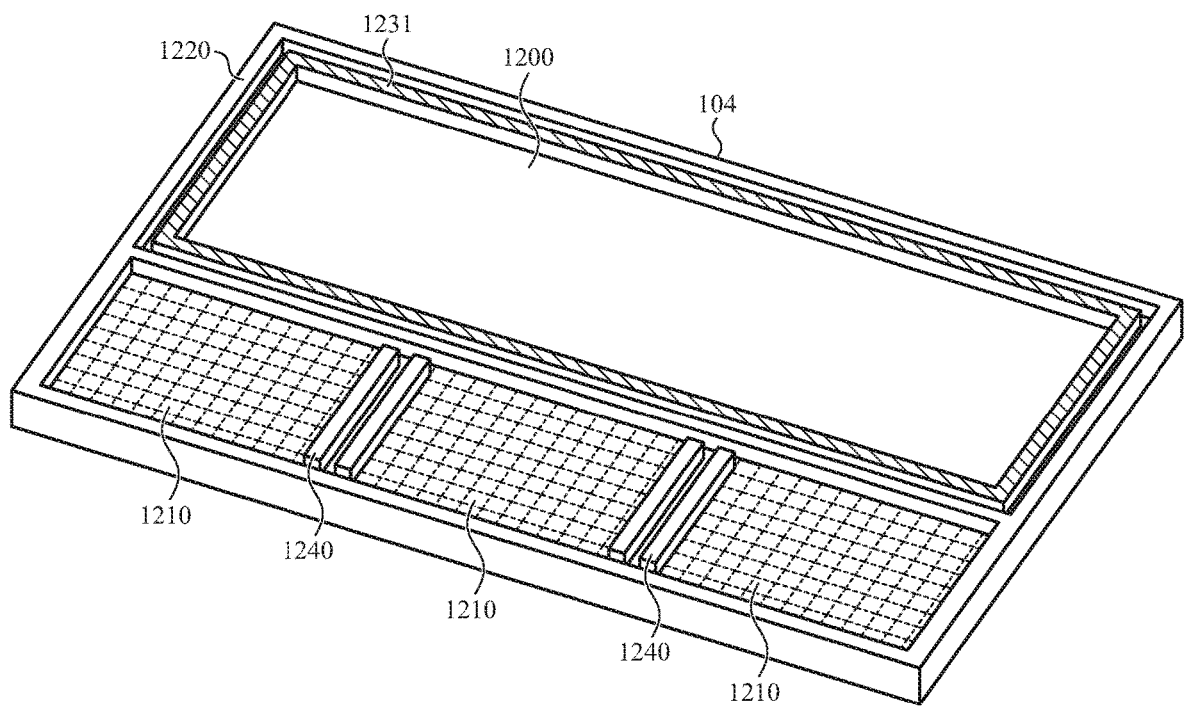
FIG. 12 illustrates an interior of a top case of a laptop computing device.

FIG. 12 is a bottom view of the top case 104 (e.g., the outer surface 114 shown in FIG. 1 is the opposing side to the side shown in this figure). A first section 1200 of the top case 104 is bounded by a stiffener 1430. The first section 1200 may accept or support a keyboard, for example. In the embodiment of FIG. 12, keyholes are omitted for simplicity; it should be appreciated that some embodiments may include keyholes defined in the first section while others omit the keyholes. In embodiments omitting the keyholes, key actuation may be sensed through the top case 104.

Multiple second sections 1210 may include a touch-sensing layer, as represented by the grid in these sections. Generally, each second section 1210 may correspond to a discrete haptic region 122, which is discussed in more detail above. Further, a second section may be bounded by a sidewall 1220 of the top case 104 and/or one or more stiffeners 1240. The stiffeners may extend from a sidewall 1220 or may be separated from the sidewall by a gap.

The stiffeners 1230, 1240 may isolate the first section 1200 and second sections 1210 from haptic output initiated by haptic actuators coupled to, or otherwise associated with, abutting sections (e.g., sections that share a common boundary), or may otherwise reduce haptic output from traveling between abutting sections. The stiffeners 1230, 1240 effectively serve to damp haptic output and prevent it from being perceptible in an abutting section.

Dimensions of the stiffeners 1230, 1240 may vary between or within embodiments. For example, the stiffener 1230 surrounding the first section 1200 may be taller (e.g., longer in a Z dimension) than the stiffeners 1240 between the second sections 1210. By increasing a height of a stiffener, damping of haptic output may be made more effective. Further, although multiple stiffeners 1240 are shown between abutting second sections 1210 (e.g., between discrete haptic regions) it should be appreciated that a single stiffener 1240 may be used in some embodiments. It should also be appreciated that multiple stiffeners may be arranged end to end to form a broken line or wall between abutting sections.

Typically, it is the presence of a haptic actuator that defines each of the multiple discrete regions, rather than a stiffener or other physical marker. While a stiffener, or a rib, or structural support may be present on the inner surface of the top case, the multiple discrete regions are defined by the presence of a haptic actuator.

In some embodiments the stiffeners 1230, 1240 may define discrete compartments for batteries that power an electronic device, as well. Accordingly, a battery may underlie, be adjacent to, and/or be approximately the same size as a discrete haptic region, and multiple batteries may underlie, be the same size as, or be adjacent to corresponding discrete haptic regions. In still other embodiments the stiffeners 1230, 1240 may be coupled to a bottom case, such as the bottom case 106 discussed above with respect to FIG. 2 as well as the top case 104.

Figure 13:
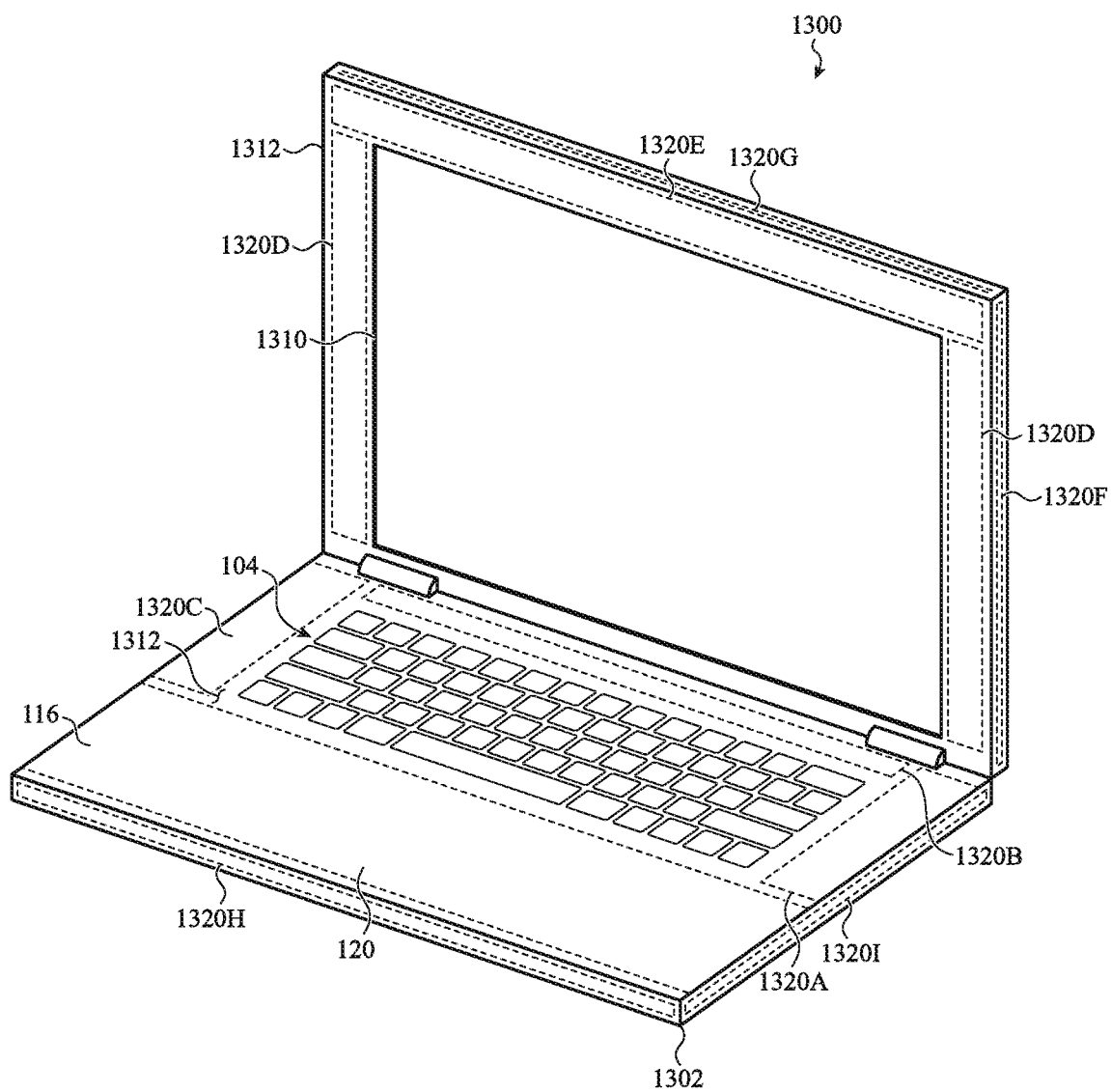
FIG. 13 illustrates a sample laptop computing device having multiple discrete haptic regions formed on the upper portion and lower portion.

The number and placement of haptic actuators can influence the spatial resolution and complexity of haptic output. In some embodiments, a haptic output can be produced in areas of the laptop computer not usually associated with user input or output. For example, FIG. 13 shows additional discrete haptic regions 1320*a*-1320*i* on the surface of the laptop computer 1300, in addition to the input area 120 located between the keyboard 116 and the user.

In some embodiments, the keyboard 116 and/or keyboard region does not extend completely from one edge of the top case to the other. That is, a width of the keyboard 116 often is less than a width of the top case. Accordingly, discrete haptic regions 1320*a* may be defined between edges of the top case 104 and the keyboard 116. Further, another discrete haptic region 1320*b* may be defined between a top of the keyboard 116 and upper edge of the top case 104.

Likewise, multiple discrete haptic regions 1320*d*, 1320*e* may encircle the display 1310. Each of these discrete haptic regions 1320*d*, 1320*e* may function as described elsewhere herein. Discrete haptic regions 1320*f*, 1320*g* may be formed on sides of the upper case, as well.

Furthermore, in some embodiments, haptic actuators may be positioned on side edges of the upper portion 1312 and lower portion 1302. For example, haptic actuators may be positioned to enable discrete haptic regions 1320*h*, 1320*i* at a front edge and side edges of a top case 104 (or of a bottom case) or an upper portion of the electronic device 1300. Furthermore, haptic actuators may be positioned to provide a haptic output at the outer surface of the bottom case (not shown) to provide a haptic output to the lap of the user or others provided to whatever surface on which the laptop computer is sitting. Likewise, haptic actuators may be positioned to provide a haptic output at the outer surface of the upper portion (not shown) to provide a haptic output to the user.

Figure 14:
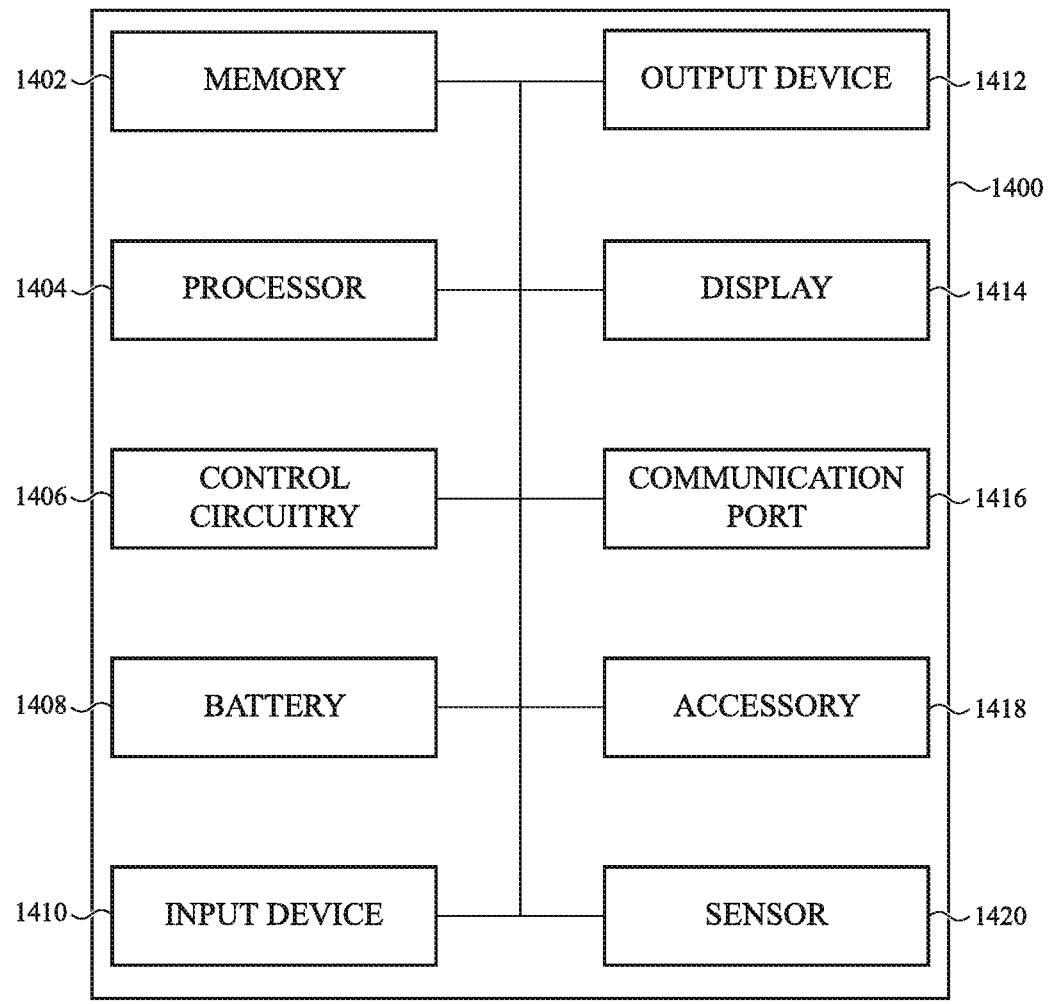
FIG. 14 is a block diagram of a sample electronic device.

FIG. 14 is a block diagram of example components of an example electronic device. The schematic representation depicted in FIG. 14 may correspond to components of any electronic device described herein.

The electronic device 1400 typically includes a processing unit 1404 operably connected to a computer-readable memory 1402. The processing unit 1404 may be operatively connected to the memory 1402 component via an electronic bus or bridge. The processing unit 1404 may be implemented as one or more computer processing units or microcontrollers configured to perform operations in response to computer-readable instructions. The processing unit 1404 may include a central processing unit (CPU) of the device 1400. Additionally and/or alternatively, the processing unit 1404 may include other electronic circuitry within the device 1400 including application specific integrated chips (ASIC) and other microcontroller devices. The processing unit 1404 may be configured to perform functionality described in the examples above. In addition, the processing unit or other electronic circuitry within the device may be provided on or coupled to a flexible circuit board in order to accommodate folding or bending of the electronic device. A flexible circuit board may be a laminate including a flexible base material and a flexible conductor. Example base materials for flexible circuit boards include, but are not limited to, polymer materials such as vinyl (e.g., polypropylene), polyester (e.g., polyethylene terephthalate (PET), biaxially-oriented PET, and polyethylene napthalate (PEN)), polyimide, polyetherimide, polyaryletherketone (e.g., polyether ether ketone (PEEK)), fluoropolymer and copolymers thereof. A metal foil may be used to provide the conductive element of the flexible circuit board.

The memory 1402 may include a variety of types of non-transitory computer-readable storage media, including, for example, read access memory (RAM), read-only memory (ROM), erasable programmable memory (e.g., EPROM and EEPROM), or flash memory. The memory 1402 is configured to store computer-readable instructions, sensor values, and other persistent software elements as well as transitory instructions, operations, and the like.

The electronic device 1400 may include control circuitry 1406. The control circuitry 1406 may be implemented in a single control unit and not necessarily as distinct electrical circuit elements. As used herein, "control unit" will be used synonymously with "control circuitry." The control circuitry 1406 may receive signals from the processing unit 1404 or from other elements of the electronic device 1400.

As shown in FIG. 14, the electronic device 1400 includes a battery 1408 that is configured to provide electrical power to the components of the electronic device 1400. The battery 1408 may include one or more power storage cells that are linked together to provide an internal supply of electrical power. The battery 1408 may be operatively coupled to power management circuitry that is configured to provide appropriate voltage and power levels for individual components or groups of components within the electronic device 1400. The battery 1408, via power management circuitry, may be configured to receive power from an external source, such as a power outlet. The battery 1408 may store received power so that the electronic device 1400 may operate without connection to an external power source for an extended period of time, which may range from several hours to several days. The battery may be flexible to accommodate bending or flexing of the electronic device. For example, the battery may be mounted to a flexible housing or may be mounted to a flexible printed circuit. In some cases, the battery 1408 is formed from flexible anodes and flexible cathode layers and the battery cell is itself flexible. In other cases, individual battery cells are not flexible, but are attached to a flexible substrate or carrier that allows an array of battery cells to bend or fold around a foldable region of the device.

As discussed above, the battery 1408 may be coupled to a bottom case of the electronic device 1400 and may be spaced apart from one or more haptic actuators coupled to a top case of the electronic device.

In some embodiments, the electronic device 1400 includes one or more input devices 1410 (such as the aforementioned first input device 116 and second input device 120, shown in FIG. 1). The input device 1410 is a device that is configured to receive input from a user or the environment. The input device 1410 may include, for example, one or more keys, a touch-sensitive surface, a force-sensitive surface a push button, a touch-activated button, a touch screen (e.g., a touch-sensitive display or a force-sensitive display), capacitive touch button, dial, crown, or the like. In some embodiments, the input device 1410 may provide a dedicated or primary function, including, for example, a power button, volume buttons, home buttons, scroll wheels, and camera buttons.

The device 1400 may also include one or more sensors 1420, such as a force sensor, a capacitive sensor, an accelerometer, a barometer, a gyroscope, a proximity sensor, a light sensor, or the like. The sensors 1420 may be operably coupled to processing circuitry, including a processing unit 1404 and/or control circuitry 1406. In some embodiments, a sensor 1420 may detect internal and/or external parameters of an electronic device 1400 or its environment, including location, position, acceleration, temperature, light, force, contact, and so on. Example sensors 1420 for this purpose include accelerometers, gyroscopes, magnetometers, and other similar types of position/orientation sensing devices. In addition, the sensors 1420 may include a microphone, acoustic sensor, light sensor, optical facial recognition sensor, or other type of sensing device.

In some embodiments, the electronic device 1400 includes one or more output devices 1412 configured to provide output to a user. The output device 1412 may include a display 1414 that renders visual information generated by the processing unit 1404. The output device 1412 may also include one or more speakers to provide audio output. The output device 1412 may also include one or more haptic actuators 118, as discussed elsewhere herein.

The display 1414 may be a liquid-crystal display (LCD), light-emitting diode (LED), organic light-emitting diode (OLED) display, an active layer organic light emitting diode (AMOLED) display, organic electroluminescent (EL) display, electrophoretic ink display, or the like. If the display 1414 is a liquid-crystal display or an electrophoretic ink display, it may also include a backlight component that can be controlled to provide variable levels of display brightness. If the display 1414 is an organic light-emitting diode or organic electroluminescent type display, the brightness of the display 1414 may be controlled by modifying the electrical signals that are provided to display elements. In addition, information regarding configuration and/or orientation of the electronic device 1400 may be used to control the output of the display 1414 as described with respect to input devices 1410.

The display may be configured to bend or fold. The display may include or be integrated with various layers, including, for example, a display element layer, display electrode layers, a touch sensor layer, a force sensing layer, and the like, each of which may be formed using flexible substrates. For example, a flexible substrate may comprise a polymer having sufficient flexibility to allow bending or folding of the display layer. Suitable polymer materials include, but are not limited to, vinyl polymers (e.g., polypropylene), polyester (e.g., polyethylene terephthalate (PET), biaxially-oriented PET, and polyethylene napthalate (PEN)), polyimide, polyetherimide, polyaryletherketone (e.g., polyether ether ketone (PEEK)), fluoropolymers and copolymers thereof. Metallized polymer films, such Mylar®, may also provide flexible substrates.

The electronic device 1400 may also include a communication port 1416 that is configured to transmit and/or receive signals or electrical communication from an external or separate device. The communication port 1416 may be configured to couple to an external device via a cable, adaptor, or other type of electrical connector. In some embodiments, the communication port 1416 may be used to couple the electronic device to a host computer.

The electronic device may also include at least one accessory 1418, such as a camera, a flash for the camera, or other such device. The camera may be connected to other parts of the electronic device such as the control circuitry.

In some embodiments, the laptop computer enclosure (including the top case) may be a single piece of any suitable material, such as metal, ceramic, glass, plastic, corundum, carbon fiber, and so on. In certain embodiments using keyboards, key mechanisms are exposed on the outside of the device, and mechanically couple to components within the device. For example, a keycap may physically depress to a dome switch (or other component) that is attached to a circuit board within the device. A top case of such a device may have openings or holes through which the keycap physically engages the component(s). As noted herein, however, an embodiment may include a continuous top case that does not define any openings or holes in the outer surface. Such continuous top cases may use one or more touch and/or force sensors below portions of the top case to detect inputs. This may include, for example, a keyboard region, an input area, a non-keyboard region, a virtual key region, or other regions of the top case. In embodiments, the touch and/or force sensor may operate through capacitive sensing, optical sensing, resistive sensing, and so on.

Additionally, although embodiments have been described herein in the context of a laptop computing device, it should be appreciated that embodiments may take the form of any suitable device, including a mobile phone, tablet computing device, appliance, touch-sensitive panel, control console for an automobile or other vehicle, wearable device, and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A laptop computing device, comprising:
   an upper portion; and
   a lower portion hingably connected to the upper portion, the lower portion comprising a member defining, along a top surface of the member:
     a keyboard region configured to accept a first input;
     a trackpad region configured to accept a second input and defining:
       a first discrete haptic region;
       a second discrete haptic region abutting the first discrete haptic region; and
       a third discrete haptic region abutting the second discrete haptic region;
     a first haptic actuator coupled to the member and configured to produce a first haptic output in the first discrete haptic region;
     a second haptic actuator coupled to the member and configured to produce a second haptic output in the second discrete haptic region; and
     a third haptic actuator coupled to the member and configured to produce a third haptic output in the third discrete haptic region; wherein:
       the first haptic output is imperceptible in the second discrete haptic region and in the third discrete haptic region to a user;
       the second haptic output is imperceptible in the first discrete haptic region and the third discrete haptic region to the user; and
       the third haptic output is imperceptible in the first discrete haptic region and the second discrete haptic region to the user.

2. The laptop computing device of claim 1, wherein:
   the trackpad region is touch-sensitive;
   the second input is a touch on the first discrete haptic region;
   the lower portion comprises an outer surface;
   the outer surface defines the trackpad region, the first discrete haptic region, the second discrete haptic region, and the third discrete haptic region;
   the first haptic output deforms the outer surface in the first discrete haptic region by at least 10 microns; and
   the first haptic output deforms the outer surface in the second discrete haptic region less than 10 microns.

3. The laptop computing device of claim 1, wherein the trackpad region is visually indistinguishable from a rest of the toe surface of the member.

4. The laptop computing device of claim 1, wherein the first haptic actuator and the second haptic actuator are linear reluctance actuators.

5. The laptop computing device of claim 1, wherein the first haptic output is imperceptible in the second discrete haptic region in an absence of the second haptic output.

6. The laptop computing device of claim 5, wherein the second haptic output destructively interferes with the first haptic output.

7. A method for providing haptic output through a housing of a laptop computing device, comprising:
   receiving an input in a trackpad area;
   determining that a haptic output is to be provided; and
   generating the haptic output in the trackpad area through operation of a haptic actuator; wherein:
     the trackpad area includes a first haptic output region, a second haptic output region, and a third haptic output region;
     the first haptic output region and the second haptic output region abut one another;
     the second haptic output region and the third haptic output region abut one another; and
     the haptic output is provided in the first haptic output region but not the second haptic output region or the third haptic output region.

8. The method of claim 7, wherein the haptic output causes a deformation of the first haptic output region but not the second haptic output region or the third haptic output region.

9. The method of claim 7, wherein:
   the first haptic output region is a palm rest area; and
   the second haptic output region receives the input.

10. The method of claim 7, wherein the first haptic output region receives the input.

11. The method of claim 10, wherein the haptic output occurs while the input is received.

12. A laptop computing device, comprising:
   an upper portion;
   a display housed in the upper portion;
   a lower portion hingably coupled to the upper portion and comprising:
     a top case defining an outer surface;
     a bottom case coupled to the top case;

a keyboard on or extending through the top case; and
a trackpad region defined along the outer surface of the top case and defining:
- a first haptic region;
- a second haptic region abutting the first haptic region;
- a third haptic region abutting the second haptic region;
- a first haptic actuator coupled to the top case within the first haptic region and configured to provide a first haptic output in only the first haptic region;
- a second haptic actuator coupled to the top case within the second haptic region and configured to provide a second haptic output in only the second haptic region; and
- a third haptic actuator coupled to the top case within the third haptic region and configured to provide a third haptic output in only the third haptic region; and the first haptic region, the second haptic region, and the third haptic region are defined by a continuous portion of the outer surface.

13. The laptop computing device of claim 12, wherein the first haptic region, the second haptic region, and the third haptic region are visually indistinguishable from one another.

14. The laptop computing device of claim 12, wherein:
the first haptic region is tactilely indistinguishable from a portion of the outer surface that is outside the trackpad region in an absence of the first haptic output;
the second haptic region is tactilely indistinguishable from the portion of the outer surface that is outside the trackpad region in an absence of the second haptic output; and
the third haptic region is tactilely indistinguishable from the portion of the outer surface that is outside the trackpad region in an absence of the third haptic output.

15. The laptop computing device of claim 12, further comprising:
a first stiffener at a boundary between the first haptic region and the second haptic region; and
a second stiffener at a boundary between the second haptic region and the third haptic region; wherein:
the first stiffener damps the first haptic output, thereby preventing perception of the first haptic output in the second haptic region;
the first stiffener and the second stiffener damp the second haptic output, thereby preventing perception of the second haptic output in the first haptic region and the third haptic region; and
the second stiffener damps the third haptic output, thereby preventing perception of the third haptic output in the second haptic region.

16. The laptop computing device of claim 15, further comprising:
a first battery adjacent the first haptic region;
a second battery adjacent the second haptic region; and
a third battery adjacent the third haptic region; wherein:
the first battery and the second battery are separated by the first stiffener; and
the second battery and the third battery are separated by the second stiffener.

17. The laptop computing device of claim 15, wherein the first haptic region, the second haptic region, and the third haptic region are touch-sensitive.

18. The laptop computing device of claim 12, wherein:
the first haptic region is touch-sensitive; and
the second haptic output is provided in response to an input in the first haptic region.

19. The laptop computing device of claim 12, further comprising a fourth haptic region on the upper portion.

20. The laptop computing device of claim 1, further comprising a fourth discrete haptic region on the top surface of the member.

* * * * *